US012772276B2

(12) United States Patent
Ryu et al.

(10) Patent No.: US 12,772,276 B2
(45) Date of Patent: Oct. 20, 2026

(54) DCI FOR INTER-CELL INTERFERENCE MEASUREMENTS

(71) Applicant: QUALCOMM Incorporated, San Diego, CA (US)

(72) Inventors: Jung Ho Ryu, Fort Lee, NJ (US); Tao Luo, San Diego, CA (US); Junyi Li, Fairless Hills, PA (US); Sony Akkarakaran, Poway, CA (US); Danlu Zhang, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 558 days.

(21) Appl. No.: 17/454,474

(22) Filed: Nov. 10, 2021

(65) Prior Publication Data

US 2023/0145852 A1 May 11, 2023

(51) Int. Cl.
*H04W 72/00* (2023.01)
*H04L 5/00* (2006.01)
(Continued)

(52) U.S. Cl.
CPC ......... *H04W 72/541* (2023.01); *H04L 5/0053* (2013.01); *H04W 72/0446* (2013.01); *H04W 72/0453* (2013.01); *H04W 72/23* (2023.01)

(58) Field of Classification Search
CPC ........ H04L 5/00; H04L 5/0053; H04W 72/04; H04W 72/541; H04W 72/23; H04W 72/0446; H04W 72/0453
See application file for complete search history.

(56) References Cited

U.S. PATENT DOCUMENTS

2004/0242260 A1* 12/2004 Lescuyer .............. H04W 36/14 455/525
2010/0167736 A1* 7/2010 Kobayashi ............ H04W 48/20 455/435.2
(Continued)

FOREIGN PATENT DOCUMENTS

WO WO-2011071554 A1 * 6/2011 ............ H04W 16/30
WO 2014123386 A1 8/2014
WO 2019099857 A1 5/2019

OTHER PUBLICATIONS

International Search Report and Written Opinion—PCT/US2022/049031—ISA/EPO—Mar. 2, 2023.
(Continued)

*Primary Examiner* — Marcus Smith
*Assistant Examiner* — Zhaohui Yang
(74) *Attorney, Agent, or Firm* — Procopio, Cory, Hargreaves & Savitch LLP/QUALCOMM Incorporated

(57) ABSTRACT

Aspects present herein relate to methods and devices for wireless communication including an apparatus, e.g., a UE and/or a base station. The apparatus may receive, from a first base station, a list of scrambling IDs associated with a plurality of neighboring base stations. The apparatus may also receive, from the first base station, at least one of an indication of at least one scrambling ID for an inter-cell interference measurement of at least one neighboring base station or an indication of one or more time and frequency resources of at least one neighboring base station for the inter-cell interference measurement. Additionally, the apparatus may measure inter-cell interference associated with the one or more time and frequency resources of at least one neighboring base station. The apparatus may also transmit, to the first base station, a report of the inter-cell interference measurement of the at least one neighboring base station.

27 Claims, 13 Drawing Sheets

(51) Int. Cl.

| | |
|---|---|
| ***H04W 72/0446*** | (2023.01) |
| ***H04W 72/0453*** | (2023.01) |
| ***H04W 72/23*** | (2023.01) |
| ***H04W 72/541*** | (2023.01) |

(56) References Cited

U.S. PATENT DOCUMENTS

| | | | | |
|---|---|---|---|---|
| 2012/0213088 | A1* | 8/2012 | Faurie | H04L 1/0028 370/241 |
| 2014/0092760 | A1* | 4/2014 | Geirhofer | H04L 5/0035 370/252 |
| 2014/0233466 | A1* | 8/2014 | Pourahmadi | H04L 5/0051 370/329 |
| 2014/0341089 | A1* | 11/2014 | Ji | H04B 7/2656 370/278 |
| 2015/0003270 | A1* | 1/2015 | Jamadagni | H04W 72/541 370/252 |
| 2015/0373569 | A1* | 12/2015 | Hwang | H04L 47/12 370/235 |
| 2016/0036542 | A1* | 2/2016 | Gong | H04W 24/10 370/329 |
| 2017/0086211 | A1* | 3/2017 | Sahin | H04W 72/12 |
| 2019/0296883 | A1* | 9/2019 | Dai | H04L 5/0091 |
| 2019/0386759 | A1* | 12/2019 | Singh | H04B 17/27 |

OTHER PUBLICATIONS

3GPP TS 25.331: "3rd Generation Partnership Project, Technical Specification Group Radio Access Network, RRC Protocol Specification (Release 4)", No. V4.1.0, Jun. 27, 2001, pp. 1-811, p. 187-188, Sections 8.4.1, 10.2.17.

* cited by examiner

DCI FOR INTER-CELL INTERFERENCE MEASUREMENTS

TECHNICAL FIELD

The present disclosure relates generally to communication systems, and more particularly, to inter-cell interference in wireless communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive, from a first base station, a list of scrambling identifiers (IDs) associated with a plurality of neighboring base stations. The apparatus may also receive, from the first base station, at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement. Additionally, the apparatus may measure an inter-cell interference associated with the one or more time and frequency resources of the at least one neighboring base station. The apparatus may also transmit, to the first base station, a report of the inter-cell interference measurement of the at least one neighboring base station. Further, the apparatus may receive, from the first base station, downlink data associated with the inter-cell interference. The apparatus may also transmit, to the first base station, an acknowledgement (ACK) or a negative ACK (NACK) based on the downlink data associated with the inter-cell interference.

In another aspect of the disclosure, a method, a computer-readable medium, and an apparatus are provided. The apparatus may be a base station. The apparatus may transmit, to at least one of the plurality of neighboring base stations, a first indication of a future downlink transmission schedule; or receive, from one or more of the plurality of neighboring base stations, a second indication of the future downlink transmission schedule. The apparatus may also transmit, to at least one UE, a list of scrambling identifiers (IDs) associated with a plurality of neighboring base stations. Also, the apparatus may transmit, to the at least one UE, at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement. The apparatus may also receive, from the at least one UE, a report of the inter-cell interference measurement of the at least one neighboring base station. Moreover, the apparatus may transmit, to the at least one UE, downlink data associated with the inter-cell interference measurement. The apparatus may also receive, from the at least one UE, an acknowledgement (ACK) or a negative ACK (NACK) based on the downlink data associated with the inter-cell interference measurement.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
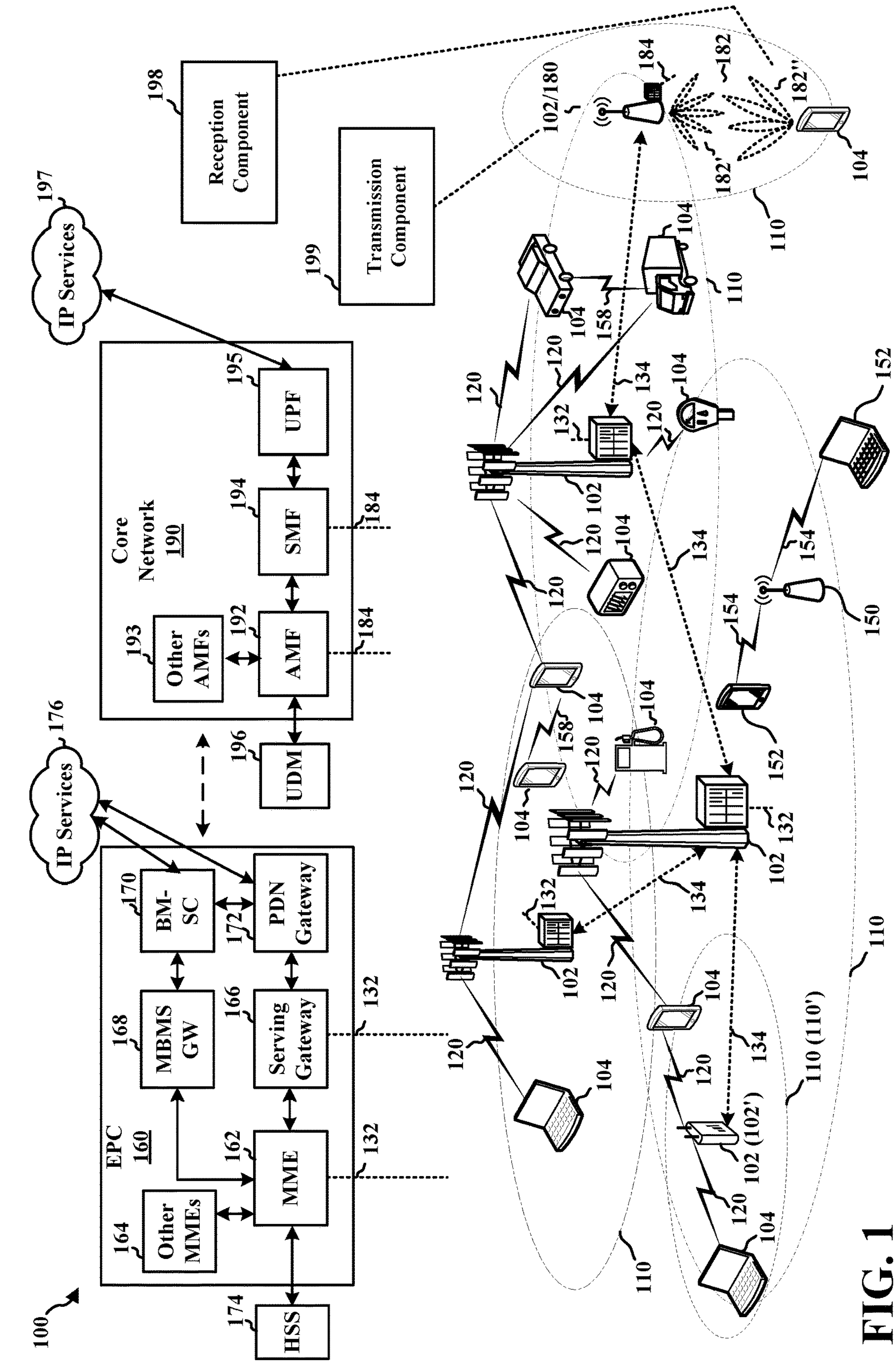
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a reception component 198 configured to receive, from a first base station, a list of scrambling identifiers (IDs) associated with a plurality of neighboring base stations. Reception component 198 may also be configured to receive, from the first base station, at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement. Reception component 198 may also be configured to measure an inter-cell interference associated with the one or more time and frequency resources of the at least one neighboring base station. Reception component 198 may also be configured to transmit, to the first base station, a report of the inter-cell interference measurement of the at least one neighboring base station. Reception component 198 may also be configured to receive, from the first base station, downlink data associated with the inter-cell interference. Reception component 198 may also be configured to transmit, to the first base station, an acknowledgement (ACK) or a negative ACK (NACK) based on the downlink data associated with the inter-cell interference.

Referring again to FIG. 1, in certain aspects, the base station 180 may include a transmission component 199 configured to transmit, to at least one of the plurality of neighboring base stations, a first indication of a future downlink transmission schedule; or receive, from one or more of the plurality of neighboring base stations, a second indication of the future downlink transmission schedule. Transmission component 199 may also be configured to transmit, to at least one UE, a list of scrambling identifiers (IDs) associated with a plurality of neighboring base stations. Transmission component 199 may also be configured to transmit, to the at least one UE, at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement. Transmission component 199 may also be configured to receive, from the at least one UE, a report of the inter-cell interference measurement of the at least one neighboring base station. Transmission component 199 may also be configured to transmit, to the at least one UE, downlink data associated with the inter-cell interference measurement. Transmission component 199 may also be configured to receive, from the at least one UE, an acknowledgement (ACK) or a negative ACK (NACK) based on the downlink data associated with the inter-cell interference measurement.

Although the following description may be focused on 5G NR, the concepts described herein may be applicable to other similar areas, such as LTE, LTE-A, CDMA, GSM, and other wireless technologies.

Figures 2A, 2B, 2C, 2D:
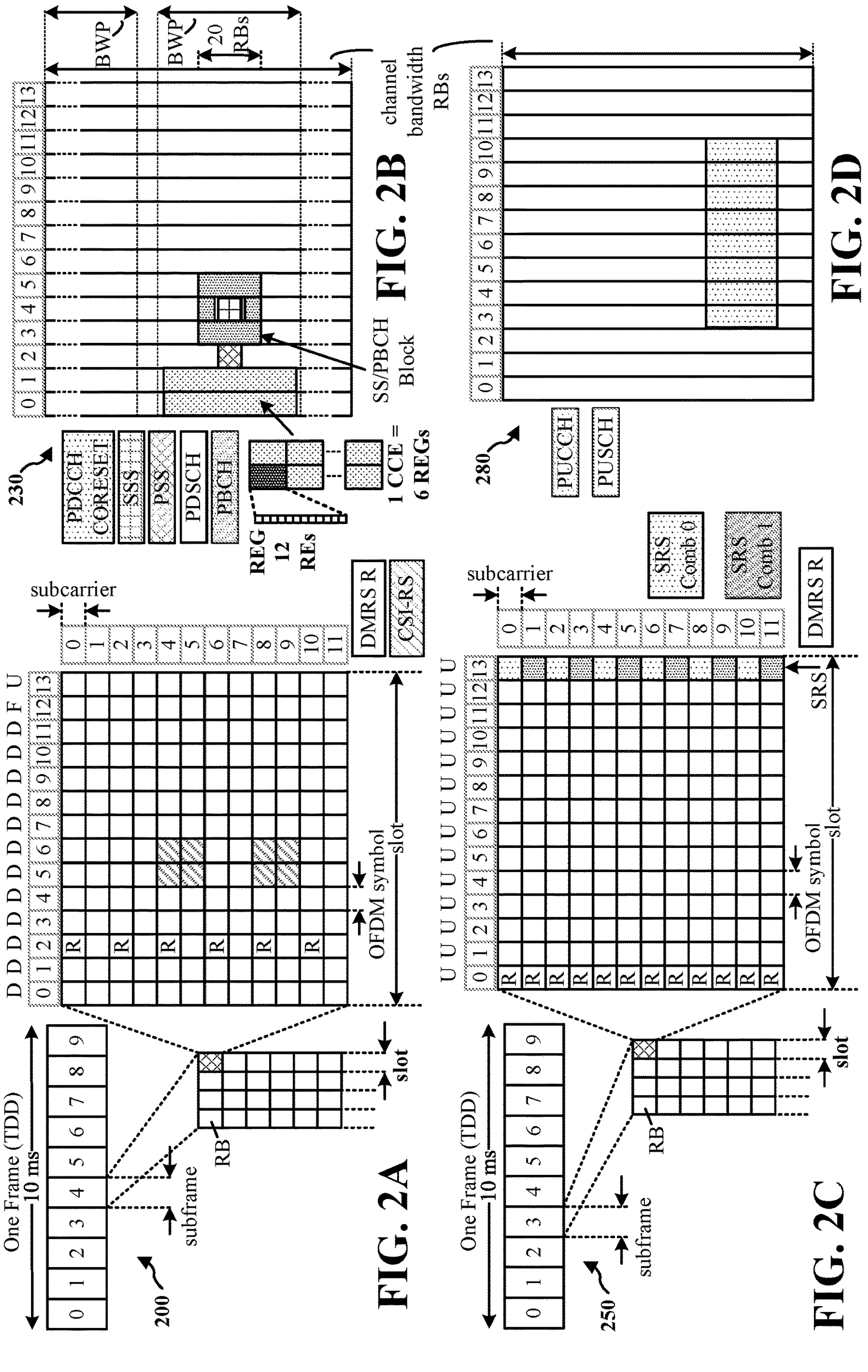
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
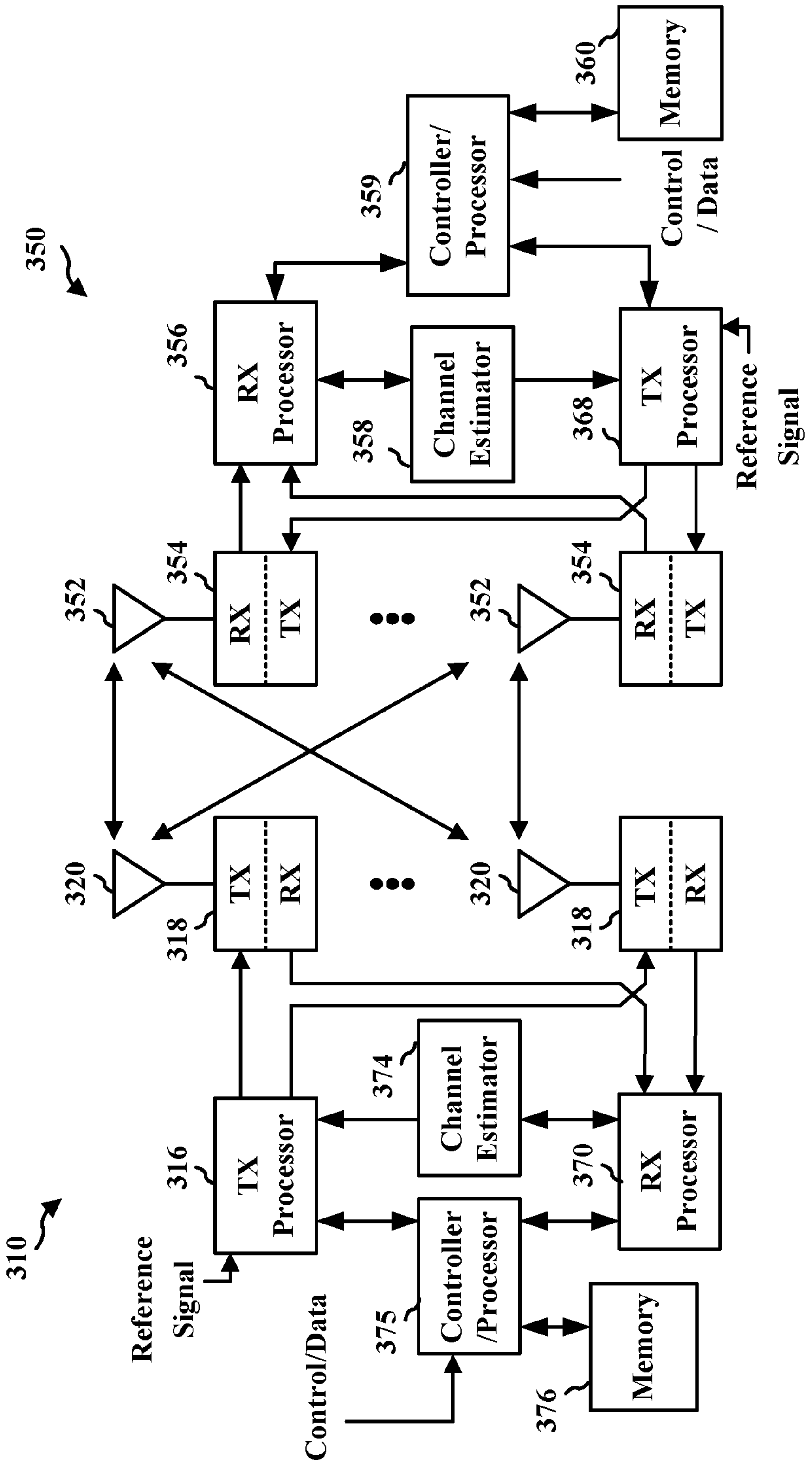
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Aspects of wireless communication, e.g., LTE or NR, may reuse frequencies in order to maximize spectrum efficiency. For instance, aspects of wireless communication may utilize certain frequency reuse factors (e.g., a frequency reuse factor of 1) in order to maximize spectrum efficiency. This may result in certain transmissions (e.g., transmissions carried out on the same time-frequency resource) causing interference between different cells. Additionally, this interference may occur at cell edges or near cell edges (i.e., the edge of coverage for a cell or base station). In some networks (e.g., macro cell networks), UEs may receive interference from a neighboring cell, while receiving a desired signal from a serving cell. Further, UEs may create interference to neighboring cells in the uplink.

Figure 4:
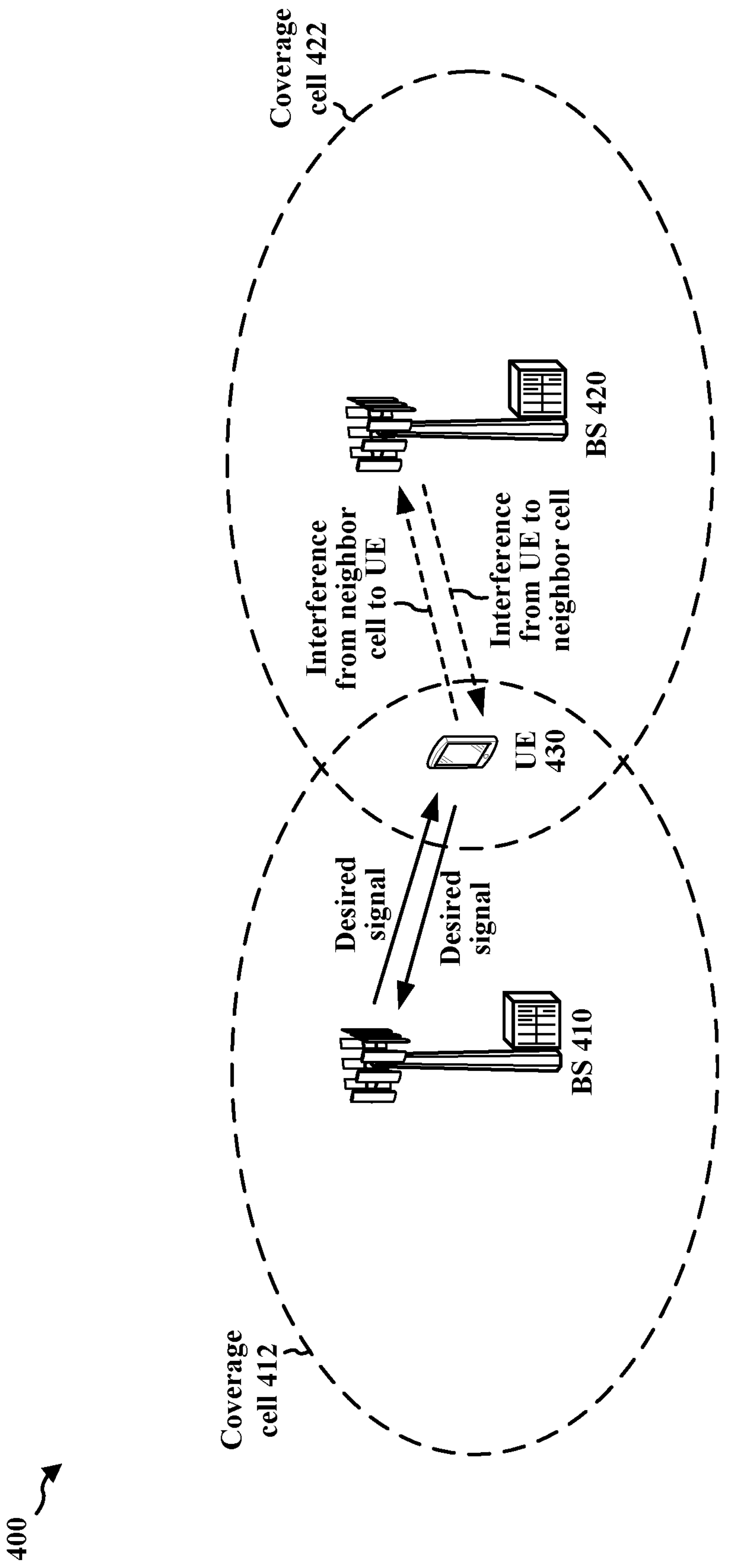
FIG. 4 is a diagram illustrating an example of inter-cell interference between UEs and base stations.

FIG. 4 is a diagram 400 illustrating an example of inter-cell interference. FIG. 4 includes base station (BS) 410 including coverage cell 412, base station 420 including coverage cell 422, and UE 430. More specifically, diagram 400 depicts UE 430 receives interference from base station 420 (i.e., a neighbor cell). As shown in FIG. 4, UE 430 also creates interference for base station 420 (i.e., a neighbor cell). As indicated herein, this interference may occur at or near cell edges, e.g., the edges of coverage cell 412 and coverage cell 422. FIG. 4 also shows that UE 430 transmits and receives a desired signal from base station 410 (i.e., its serving cell). Accordingly, the interference to/from the neighbor cell (e.g., base station 420) may interfere with the desired signal from the serving cell (e.g., base station 410).

Figure 5B:
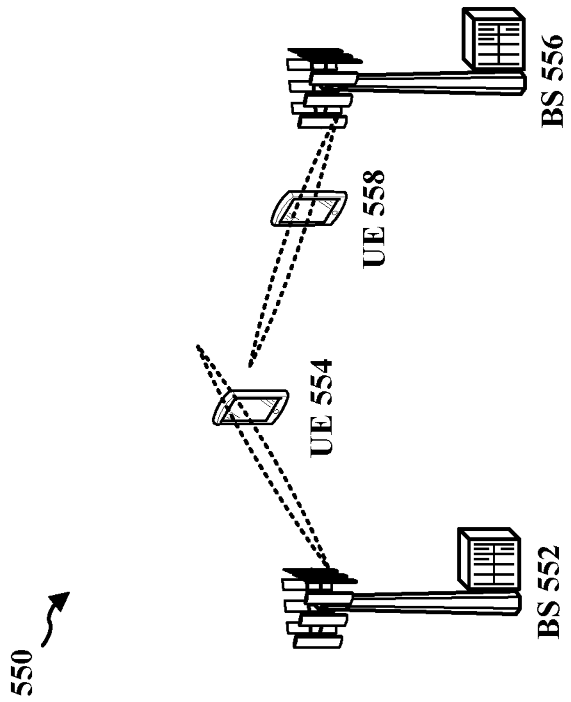
FIG. 5B is a diagram illustrating an example wireless communication system.
Figure 5A:
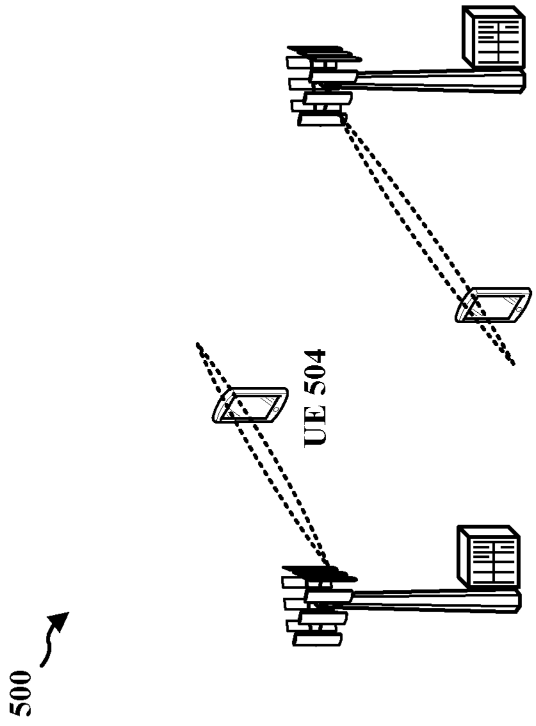
FIG. 5A is a diagram illustrating an example wireless communication system.

FIGS. 5A and 5B are diagrams 500 and 550, respectively, illustrating wireless communication systems. As shown in FIGS. 5A and 5B, diagram 500 includes base station 502, UE 504, base station 506, and UE 508, while diagram 550 includes base station 552, UE 554, base station 556, and UE 558. As depicted in FIGS. 5A and 5B, transmissions may be beamformed in certain types of wireless systems (e.g., in massive MIMO systems). Depending on the orientation of the UE in relation to the base station and the direction of the beams from the neighboring cell, the level of the interference caused by the neighboring cell at a given UE may vary widely. FIG. 5A illustrates a scenario where UE 504 communicating with base station 502 may experience minimal interference caused by the communication between base station 506 and UE 508. For instance, the interference may be minimal because the beam generated by base station 506 for communication with UE 508 may point in a direction that avoids the UE 504. Accordingly, UE 504 may receive communications from base station 502 at a higher signal quality compared to communications with more interference (e.g., the signal-to-interference-plus-noise ratio (SINR) at the UE 504 may be high, e.g., at 20 dB).

FIG. 5B illustrates a scenario where UE 554 communicating with base station 552 may experience a high level of interference caused by the communication between base station 556 and UE 558 because the beam generated by the base station 556 for communication with the UE 558 may point directly toward the UE 554. As depicted in FIG. 5B, if a beam from the neighboring cell is in a direction that points towards the UE, then the UE may experience a high level of interference, a low throughput, and/or a poor user experience. Accordingly, UE 554 may receive communications from base station 552 at a lower signal quality compared to communications with less interference (e.g., the signal-to-interference-plus-noise ratio (SINR) at the first UE 554 may be low, e.g., at 5 dB).

In order to reduce the level of interference caused by a neighboring cell, some cells may coordinate their scheduling and may assign different or non-overlapping time-frequency resources to UEs (e.g., the UEs 504 and 508). This type of coordination may be referred to as interference coordination. Additionally, in order to enable interference coordination, a mechanism may be provided to enable the base station or other network entities (e.g., entities in a core network) to identify the inter-cell interference described above. Specifically, the network entity (e.g., a base station or another entity) may identify the set of victim UEs that experience high interference and the base station that is causing the interference. In some configurations, the network entity may identify the beam or precoder used by the interfering base station that results in the high interference. Based on the gathered information, the network entity may initiate scheduling coordination or interference coordination.

In some aspects of wireless communication, base stations may allocate certain resources for downlink transmissions towards UEs. The downlink transmissions may be a reference signal transmission including a demodulation reference signal (DMRS) or a channel state information reference signal (CSI-RS), or may be a data transmission. The base station may configure a subset of resources within the allocated downlink resources to be null resources, i.e., resources on which no energy is transmitted. The configuration may be coordinated between base stations (and possibly other network entities) such that each base station may configure a unique subset of resources to be null resources. The subset of resources that have been configured as null resources may constitute a pattern of null resources, which may be used as a unique signature of the corresponding base station.

In some instances, within the downlink transmission (e.g., an interfering downlink transmission) from a second base station (e.g., an interfering base station) to a second UE, a subset of downlink resources may be configured by the second base station to be null resources. The pattern of null resources may be unique to the second base station, and may thus serve as a signature of the second base station. The downlink transmission may cause interference to a first UE because the associated beam may point at the first UE. The first UE may be referred to as the victim UE. Based on signal or channel state measurements, the first UE may identify the pattern of null resources contained in the downlink transmission without decoding the downlink transmission (e.g., without decoding the message or the header). In some aspects, the first UE may transmit an indication of the pattern of null resources to the first base station. Based on the association between the pattern of null resources and the second base station, which may be known to the first base station (e.g., as a result of inter-base station coordination of null resource patterns), the first base station may identify the second base station based on the indication of the pattern of null resources. Accordingly, the first base station may initiate an interference coordination process with the second base station.

Figure 6:
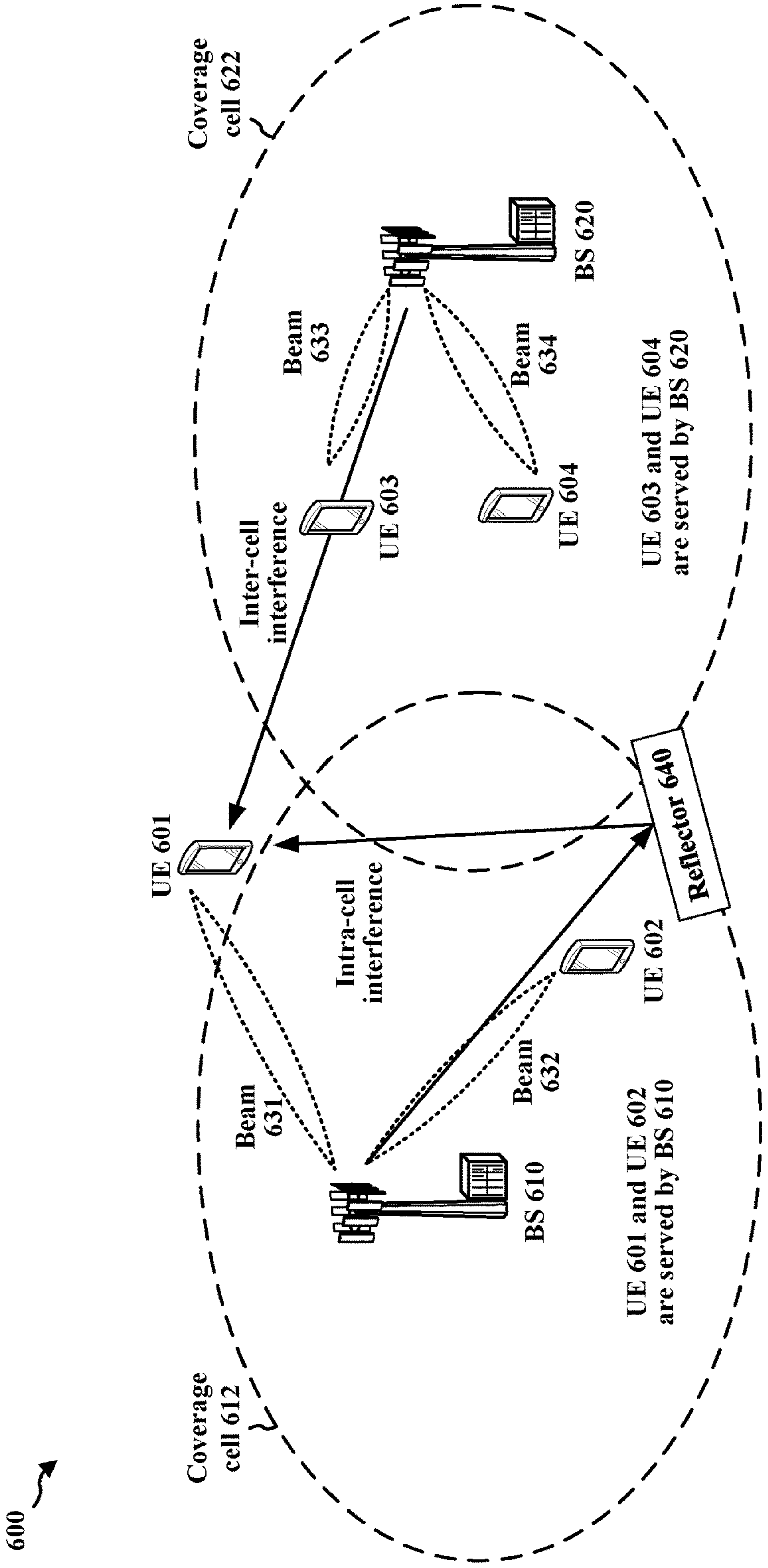
FIG. 6 is a diagram illustrating an example of inter-cell interference between UEs and base stations.

FIG. 6 is a diagram 600 illustrating an example of inter-cell interference. FIG. 6 includes base station (BS) 610 including coverage cell 612, base station 620 including coverage cell 622, reflector 640, and UEs 601, 602, 603, 604. As shown in FIG. 6, UE 601 and UE 602 are served by base station 610, while UE 603 and UE 604 are served by base station 620. More specifically, UE 601 is served by base station 610 via beam 631, UE 602 is served by base station 610 via beam 632, UE 603 is served by base station 620 via beam 633, and UE 604 is served by base station 620 via beam 634. Diagram 600 shows that beam 632 from base station 610 (via reflector 640) causes intra-cell interference for UE 601 (i.e., beam 632 interferes with beam 631). Additionally, beam 633 from base station 620 causes inter-cell interference for UE 601. Moreover, there may be a backhaul connection (not shown in FIG. 6) between base station 610 and base station 620.

As depicted in FIG. 6, downlink communication performance may depend on different beam measurements or metrics, e.g., SINR. Further, signal power may depend on the channel between a UE and serving base station. Signal power may also vary over a range due to changing channel conditions and/or UE movement. Beam measurements or metrics may help to reduce uncertainty/range of the communication. Beam/channel interference may depend on the channels between UEs and neighboring base stations. Interference may also vary over a range for the same reasons listed above, even if the actions of neighboring base stations are fixed.

Additionally, interference may vary depending on the actions of neighboring base stations. In some instances, without knowing the actions of neighboring base stations, instantaneous measurements of interference may not be useful for UEs. The measurement of average interference (i.e., measurements averaged over all neighboring cells) may not be as useful to UEs as knowing the specific type of interference and the source of the interference. In some instances, it may be beneficial for UEs to determine how to understand the source of interference, as well as for UEs to determine which neighboring base stations and/or which beam is providing the interference.

In some aspects of wireless communication, at least one DMRS may be transmitted with a physical downlink shared channel (PDSCH) to help the target receive (Rx) UE estimate a channel to help decode a data payload. The location of a first DMRS within the PDSCH may be known to the UE. For example, the first DMRS may be either a third or fourth symbol in a slot containing the PDSCH (e.g., for PDSCH mapping type A, slot based scheduling). There may also be more than one or more DMRS symbols. The DMRS is a pseudo-random sequence that is generated using a scrambling ID, a slot number, and/or a symbol number. The target Rx UE may be configured with the scrambling IDs. In some instances, if another UE knows the scrambling IDs, it may potentially also receive the DMRS intended for the target Rx UE.

Some types of downlink transmissions may utilize downlink control information (DCI), which is a control signal in a first layer (L1) (i.e., a physical (PHY) layer). Certain types of DCI may schedule different types of uplink/downlink transmissions. For example, some types of DCI (e.g., 0_x) may be used for scheduling uplink transmissions. Other types of DCI (e.g., 1_x) may be utilized to schedule downlink transmissions. Additionally, some types of DCI (e.g., 2_x) may be used for canceling scheduled UE-UTRAN (Uu) transmissions and/or power control. Yet other types of DCI (e.g., 3_x) may be utilized to schedule sidelink transmissions between UEs.

Based on the above, it may be beneficial for a base station to inform its served UE that a neighboring base station is going to transmit certain types of downlink transmissions. For example, it may be beneficial for a base station to inform its served UE that a neighboring base station is going to transmit a PDSCH with DMRS based on a scrambling ID at some time/frequency location. Based on this, the served UE may then measure interference from the neighboring base station based on the received DMRS from the neighboring base station. Additionally, it may be beneficial to use DCI to schedule inter-cell interference measurements (e.g., downlink inter-cell interference measurements). It may also be beneficial for base stations to provide a new DCI format to schedule inter-cell interference measurements.

Aspects of the present disclosure may allow a base station to inform its served UE that a neighboring base station is going to transmit certain types of downlink transmissions. For instance, aspects of the present disclosure may allow for a base station to inform its served UE that a neighboring base station will transmit a PDSCH with DMRS based on a scrambling ID at some time/frequency location. By doing so, the served UE may then measure interference from the neighboring base station based on the received DMRS from the neighboring base station. In some instances, aspects of the present disclosure may utilize DCI to schedule inter-cell interference measurements (e.g., downlink inter-cell interference measurements). Additionally, aspects of the present disclosure may allow base stations to provide a new DCI format to schedule inter-cell interference measurements.

Some aspects of the present disclosure may allow for coordination between base stations regarding potentially interfering transmissions. For instance, aspects of the present disclosure may inform each other of their future downlink transmission schedule. Base stations may also communicate over backhaul connections, e.g., an X2 interface (i.e., the interface connecting neighboring base stations in a peer-to-peer fashion). Further, base stations may communicate the time and frequency resources of any future downlink transmissions, such as the time and frequency resources of a future PDSCH (e.g., PDSCH type A and type B). Base stations may also communicate the scrambling IDs that will be used to scramble the DMRS of PDSCH transmissions.

Further, aspects of the present disclosure may utilize DCI for interference measurements. For instance, a base station may transmit DCI to a UE that contains time and/or frequency resources in which the UE can measure inter-cell interference from a neighboring base station. In some instances, the DCI may contain multiple scrambling IDs (e.g., 16-bit scrambling IDs) corresponding to different PDSCH transmissions from neighboring base stations. Base stations may have provided a list of the scrambling IDs to the UE beforehand, and the DCI may contain an indication of which scrambling IDs to use for interference measurements.

In some aspects, by using the time and/or frequency resource information and the scrambling IDs, a UE may generate pseudo-random sequences that the UE will use to measure inter-cell interference. The DCI may also indicate which receive (Rx) beam the UE can use to measure the inter-cell interference. For example, the Rx beam used for inter-cell interference may be different from the serving Rx beam. Additionally, the DCI may be addressed to a group of UEs, in addition to being addressed to a single UE. By addressing the DCI to a group of UEs, all UEs within the group may measure the inter-cell interference.

As indicated herein, aspects of the present disclosure may utilize inter-cell interference measurement reporting between UEs and/or base stations. For instance, a UE may measure interference and report the measured interference to its serving base station. The measured interference report may contain scrambling IDs and the associated interference measurements. Additionally, the measured interference report may indicate the Rx beam used to perform the interference measurements. In some instances, the DCI that triggered the inter-cell interference measurements may also indicate the time and frequency resource for transmitting the inter-cell interference measurement report. Moreover, the inter-cell interference report may be a part of a channel state information (CSI) report. In this case, the inter-cell interference report may be sent whenever the CSI report is transmitted by the UE.

In some instances, DCI may schedule the uplink transmission of the inter-cell interference measurement report. For instance, the DCI may contain two sets of time and frequency resources. The first set of time and frequency resources may be used for measuring the inter-cell interference. The second set of time and frequency resources may be utilized for making an uplink transmission (i.e., to the base station) including the report of the inter-cell interference measurement. In some aspects, the UE may also include its physical location information (e.g., global positioning system (GPS) information) in the inter-cell interference measurement report.

As indicated above, UEs may measure inter-cell interference and/or identify the source of the interference. For instance, the serving base station may inform the UE of which interfering signal (e.g., DMRS) to search/monitor, as well as the time and frequency resource in which the interfering signal is located. The serving base station may also inform the UE that a neighboring base station will transmit the interfering signal (e.g., a DMRS and/or DMRS in a PDSCH) in the indicated time/frequency resources. The UE may then send the measured inter-cell interferences in a report to the serving base station. In some instances, base stations may coordinate their downlink transmissions to avoid or reduce inter-cell interference. However, interference coordination may not entirely eliminate inter-cell interference. In some instances, interference measurements may not completely identify all sources of inter-cell interference. For instance, a UE may not want to dedicate many resources to inter-cell interference measurements. Accordingly, additional methods of reporting inter-cell interference may be utilized with a serving base station.

In addition to sending certain information, e.g., an acknowledgement (ACK) or a negative ACK (NACK) in a physical uplink control channel (PUCCH), a UE may also transmit information regarding inter-cell interference. For example, a UE may indicate the amount of inter-cell interference from neighboring base stations during the reception of channels/signals, e.g., a PDSCH corresponding to the ACK/NACK. In some instances, a UE may identify neighboring base stations based on the DMRS sequence that the UE has been instructed to search for or monitor by the serving base station. The UE may also indicate the ACK/NACK that is conditioned on the inter-cell interference. For example, the UE may indicate a NACK when the UE is not able to decode a PDSCH. The UE may also indicate that if the inter-cell interference from a neighboring base station had been lower by a certain amount (e.g., x dB), the UE may have been able to decode the PDSCH. Additionally, the UE may indicate an ACK when the UE is able to decode a PDSCH. The UE may also indicate that if the inter-cell interference from a neighboring base station can be lowered by a certain amount (e.g., x dB), the transmit power from the serving base station may be able to be reduced by a certain amount (e.g., y dB).

Aspects of the present disclosure may include a number of benefits or advantages. For instance, aspects of the present disclosure may allow UEs and base stations to determine which neighboring base stations (and their corresponding beams) are causing interference to the UE and/or base station. Understanding which neighboring base stations (and their beams) are causing interference may enable base stations to coordinate their downlink transmissions with other base stations. By allowing base stations to coordinate their downlink transmissions with other base stations, inter-cell interference may be reduced or minimized.

Figure 7:
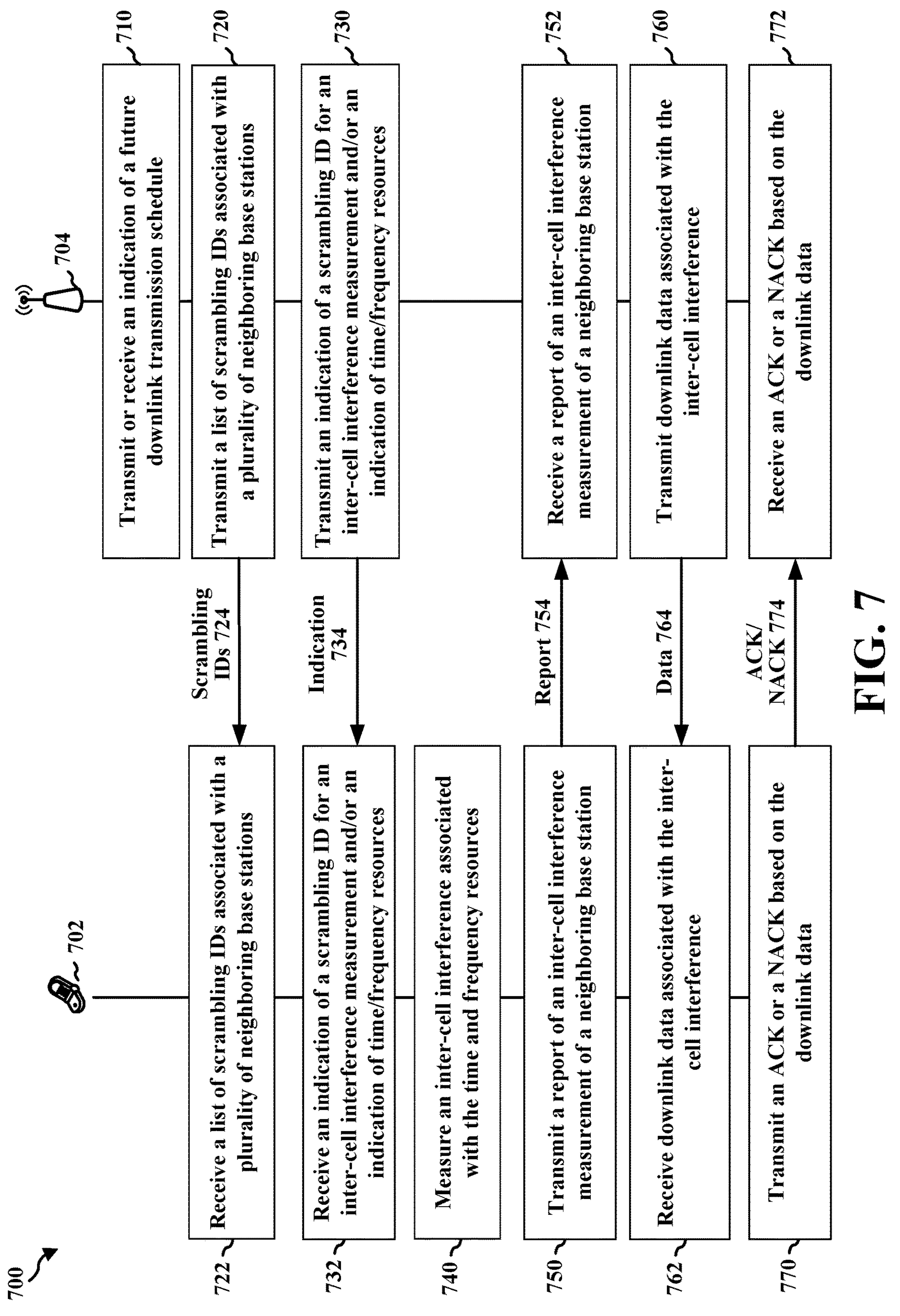
FIG. 7 is a diagram illustrating example communication between a UE and a base station.

FIG. 7 is a diagram 700 illustrating example communication between a UE 702 and a base station 704.

At 710, base station 704 may transmit, to at least one of the plurality of neighboring base stations, a first indication of a future downlink transmission schedule; or receive, from one or more of the plurality of neighboring base stations, a second indication of the future downlink transmission schedule.

At 720, base station 704 may transmit, to at least one UE (e.g., UE 702), a list of scrambling identifiers (IDs) (e.g., scrambling IDs 724) associated with a plurality of neighboring base stations. At 722, UE 702 may receive, from a first base station (e.g., base station 704), a list of scrambling identifiers (IDs) (e.g., scrambling IDs 724) associated with a plurality of neighboring base stations. The list of scrambling IDs may include one or more scrambling IDs associated with scrambling a demodulation reference signal (DMRS) of a physical downlink shared channel (PDSCH) transmission. The first base station may be a serving base station of the UE.

At 730, base station 704 may transmit, to the at least one UE (e.g., UE 702), at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement (e.g., indication 734). At 732, UE 702 may receive, from the first base station (e.g., base station 704), at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement (e.g., indication 734).

In some aspects, the indication of the one or more time and frequency resources may be received via downlink control information (DCI). The indication of the at least one scrambling ID may be received via at least one of: downlink control information (DCI), a medium access control (MAC) control element (MAC-CE), or a radio resource control (RRC) message. The list of scrambling IDs may be received via a medium access control (MAC) control element (MAC-CE) or a radio resource control (RRC) message. The indication of the one or more time and frequency resources may indicate a receive (Rx) beam or a transmission configuration indication (TCI) state for the inter-cell interference measurement. Also, the indication of the one or more time and frequency resources may indicate a time or a frequency in which to transmit the report of the inter-cell interference measurement.

Additionally, the one or more time and frequency resources may be associated with at least one of the inter-cell interference measurement or scheduling an uplink transmission of the report of the inter-cell interference measurement. At least one of the at least one scrambling ID or the one or more time and frequency resources may be associated with one or more pseudo-random sequences for the inter-cell interference measurement. The one or more time and frequency resources may include a first set of time and frequency resources for the inter-cell interference measurement and a second set of time and frequency resources for the report of the inter-cell interference measurement.

At 740, UE 702 may measure an inter-cell interference associated with the one or more time and frequency resources of the at least one neighboring base station.

At 750, UE 702 may transmit, to the first base station (e.g., base station 704), a report of the inter-cell interference measurement of the at least one neighboring base station (e.g., report 754). At 752, base station 704 may receive, from the at least one UE (e.g., UE 702), a report of the inter-cell interference measurement of the at least one neighboring base station (e.g., report 754).

At 760, base station 704 may transmit, to the at least one UE (e.g., UE 702), downlink data associated with the inter-cell interference measurement (e.g., data 764). At 762, UE 702 may receive, from the first base station (e.g., base station 704), downlink data associated with the inter-cell interference (e.g., data 764). The downlink data may be received via a physical downlink shared channel (PDSCH). The report of the inter-cell interference measurement may include at least one of: the at least one scrambling ID or the one or more time and frequency resources. The report of the inter-cell interference measurement may be included in a channel state information (CSI) report.

At 770, UE 702 may transmit, to the first base station (e.g., base station 704), an acknowledgement (ACK) or a negative ACK (NACK) based on the downlink data associated with the inter-cell interference (e.g., ACK/NACK 774). At 772, base station 704 may receive, from the at least one UE (e.g., UE 702), an acknowledgement (ACK) or a negative ACK (NACK) based on the downlink data associated with the inter-cell interference measurement (e.g., ACK/NACK 774). The ACK or the NACK may be associated with the inter-cell interference measurement of the at least one neighboring base station. The ACK may indicate the UE decoded the PDSCH based on the inter-cell interference measurement of the at least one neighboring base station. The NACK may indicate the UE did not decode the PDSCH based on the inter-cell interference measurement of the at least one neighboring base station. Also, the ACK or the NACK may be transmitted via a physical uplink control channel (PUCCH).

Figure 8:
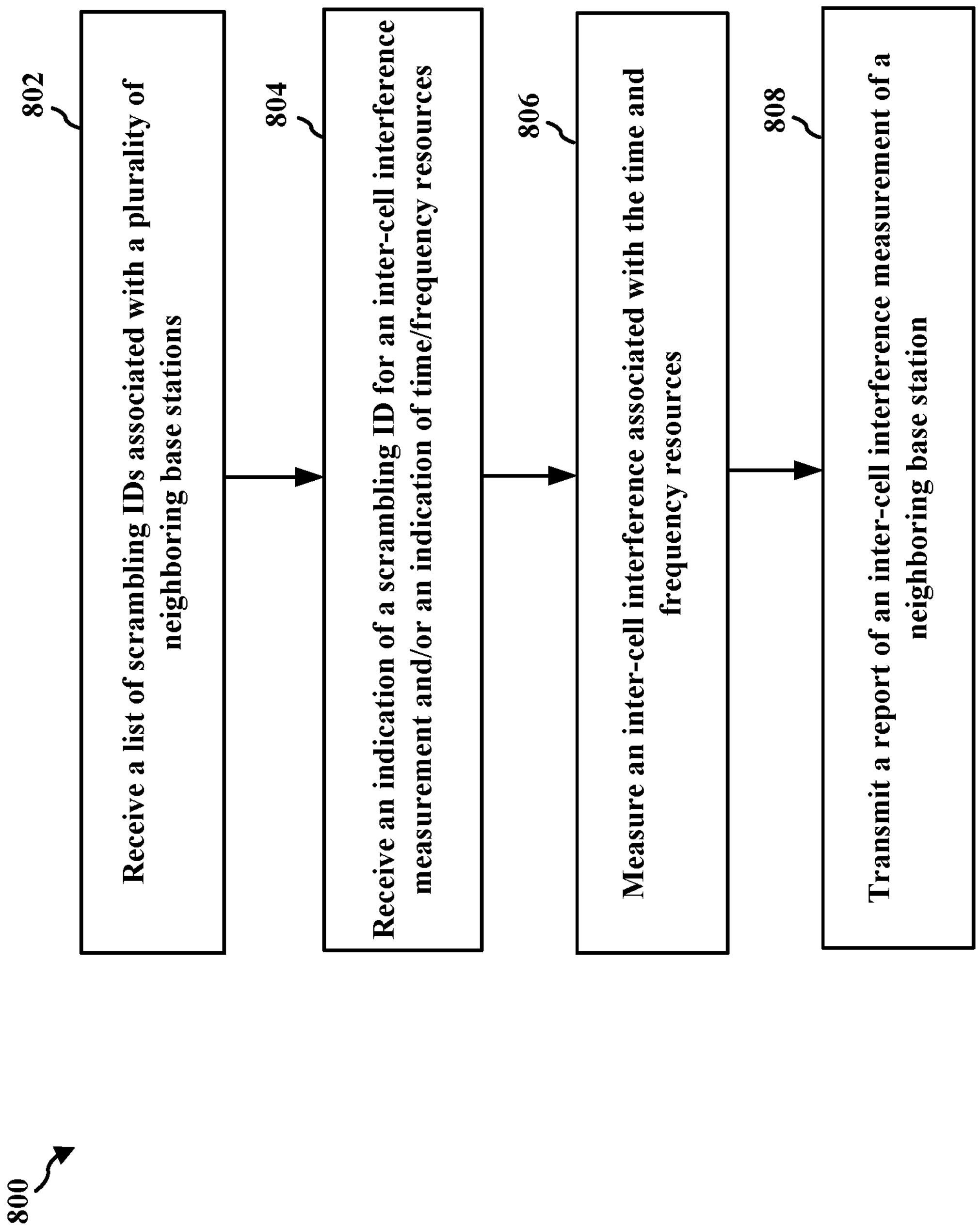
FIG. 8 is a flowchart of a method of wireless communication.

FIG. 8 is a flowchart 800 of a method of wireless communication. The method may be performed by a UE or a component of a UE (e.g., the UE 104, 350, 430, 504, 554, 601, 702; the apparatus 1202). The methods described herein may provide a number of benefits, such as improving communication signaling, resource utilization, and/or power savings.

At 802, the UE may receive, from a first base station, a list of scrambling identifiers (IDs) associated with a plurality of neighboring base stations, as described in connection with the examples in FIGS. 4-7. For example, UE 702 may receive, from a first base station, a list of scrambling identifiers (IDs) associated with a plurality of neighboring base stations, as described in connection with 722 in FIG. 7. Further, 802 may be performed by determination component 1240 in FIG. 12. The list of scrambling IDs may include one or more scrambling IDs associated with scrambling a demodulation reference signal (DMRS) of a physical downlink shared channel (PDSCH) transmission. The first base station may be a serving base station of the UE.

At 804, the UE may receive, from the first base station, at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement, as described in connection with the examples in FIGS. 4-7. For example, UE 702 may receive, from the first base station, at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement, as described in connection with 732 in FIG. 7. Further, 804 may be performed by determination component 1240 in FIG. 12.

In some aspects, the indication of the one or more time and frequency resources may be received via downlink control information (DCI). The indication of the at least one scrambling ID may be received via at least one of: downlink control information (DCI), a medium access control (MAC) control element (MAC-CE), or a radio resource control (RRC) message. The list of scrambling IDs may be received via a medium access control (MAC) control element (MAC-CE) or a radio resource control (RRC) message. The indication of the one or more time and frequency resources may indicate a receive (Rx) beam or a transmission configuration indication (TCI) state for the inter-cell interference measurement. Also, the indication of the one or more time and frequency resources may indicate a time or a frequency in which to transmit the report of the inter-cell interference measurement.

Additionally, the one or more time and frequency resources may be associated with at least one of the inter-cell interference measurement or scheduling an uplink transmission of the report of the inter-cell interference measurement. At least one of the at least one scrambling ID or the one or more time and frequency resources may be associated with one or more pseudo-random sequences for the inter-cell interference measurement. The one or more time and frequency resources may include a first set of time and frequency resources for the inter-cell interference measurement and a second set of time and frequency resources for the report of the inter-cell interference measurement.

At 806, the UE may measure an inter-cell interference associated with the one or more time and frequency resources of the at least one neighboring base station, as described in connection with the examples in FIGS. 4-7. For example, UE 702 may measure an inter-cell interference associated with the one or more time and frequency resources of the at least one neighboring base station, as described in connection with 740 in FIG. 7. Further, 806 may be performed by determination component 1240 in FIG. 12.

At 808, the UE may transmit, to the first base station, a report of the inter-cell interference measurement of the at least one neighboring base station, as described in connection with the examples in FIGS. 4-7. For example, UE 702 may transmit, to the first base station, a report of the inter-cell interference measurement of the at least one neighboring base station, as described in connection with 750 in FIG. 7. Further, 808 may be performed by determination component 1240 in FIG. 12. The report of the inter-cell interference measurement may include at least one of: the at least one scrambling ID or the one or more time and frequency resources. The report of the inter-cell interference measurement may be included in a channel state information (CSI) report.

Figure 9:
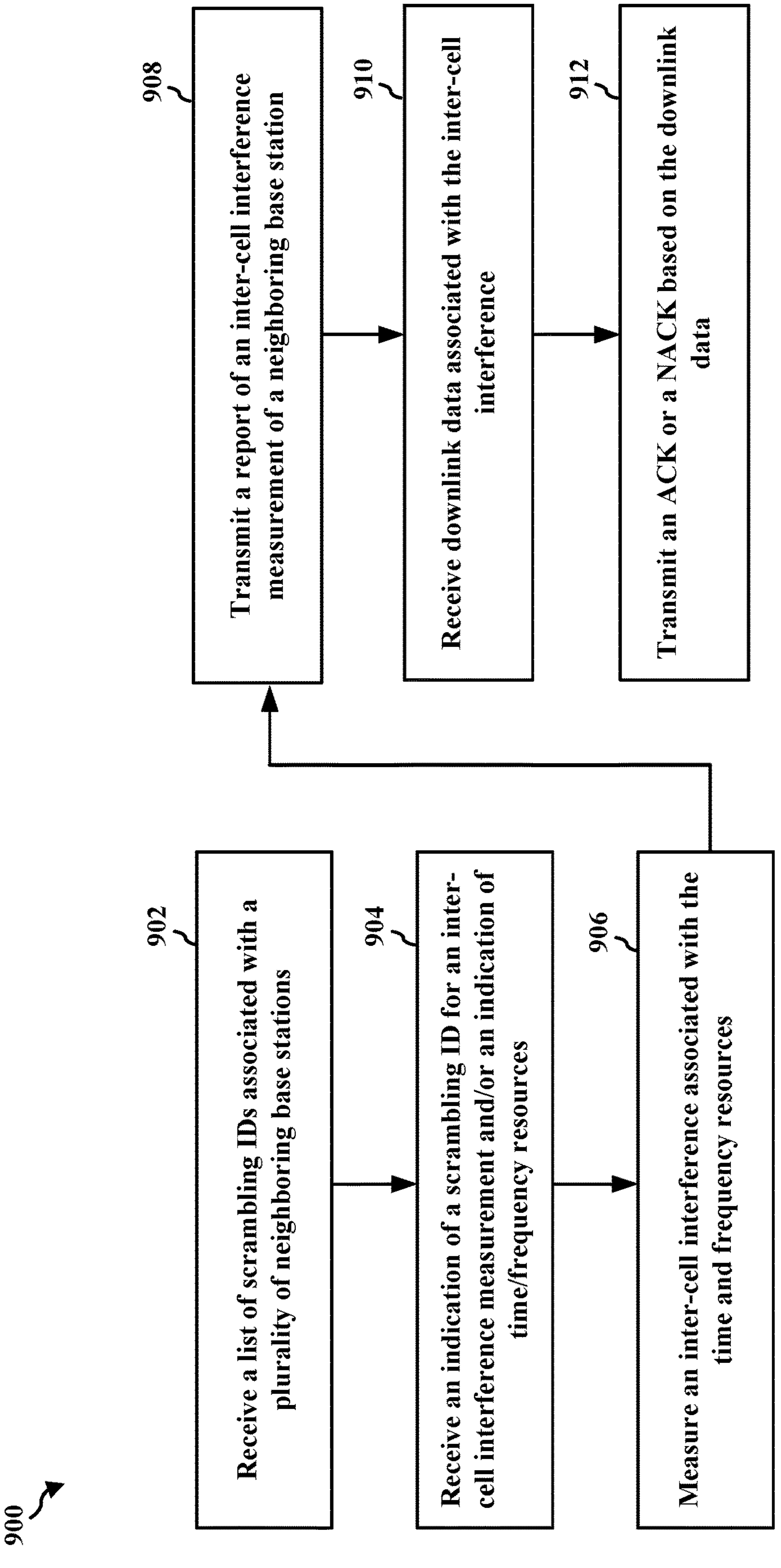
FIG. 9 is a flowchart of a method of wireless communication.

FIG. 9 is a flowchart 900 of a method of wireless communication. The method may be performed by a UE or a component of a UE (e.g., the UE 104, 350, 430, 504, 554, 601, 702; the apparatus 1202). The methods described herein may provide a number of benefits, such as improving communication signaling, resource utilization, and/or power savings.

At 902, the UE may receive, from a first base station, a list of scrambling identifiers (IDs) associated with a plurality of neighboring base stations, as described in connection with the examples in FIGS. 4-7. For example, UE 702 may receive, from a first base station, a list of scrambling identifiers (IDs) associated with a plurality of neighboring base stations, as described in connection with 722 in FIG. 7. Further, 902 may be performed by determination component 1240 in FIG. 12. The list of scrambling IDs may include one or more scrambling IDs associated with scrambling a demodulation reference signal (DMRS) of a physical downlink shared channel (PDSCH) transmission. The first base station may be a serving base station of the UE.

At 904, the UE may receive, from the first base station, at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement, as described in connection with the examples in FIGS. 4-7. For example, UE 702 may receive, from the first base station, at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement, as described in connection with 732 in FIG. 7. Further, 904 may be performed by determination component 1240 in FIG. 12.

In some aspects, the indication of the one or more time and frequency resources may be received via downlink control information (DCI). The indication of the at least one scrambling ID may be received via at least one of: downlink control information (DCI), a medium access control (MAC) control element (MAC-CE), or a radio resource control (RRC) message. The list of scrambling IDs may be received via a medium access control (MAC) control element (MAC-CE) or a radio resource control (RRC) message. The indication of the one or more time and frequency resources may indicate a receive (Rx) beam or a transmission configuration indication (TCI) state for the inter-cell interference measurement. Also, the indication of the one or more time and frequency resources may indicate a time or a frequency in which to transmit the report of the inter-cell interference measurement.

Additionally, the one or more time and frequency resources may be associated with at least one of the inter-cell interference measurement or scheduling an uplink transmission of the report of the inter-cell interference measurement. At least one of the at least one scrambling ID or the one or more time and frequency resources may be associated with one or more pseudo-random sequences for the inter-cell interference measurement. The one or more time and frequency resources may include a first set of time and frequency resources for the inter-cell interference measurement and a second set of time and frequency resources for the report of the inter-cell interference measurement.

At 906, the UE may measure an inter-cell interference associated with the one or more time and frequency resources of the at least one neighboring base station, as described in connection with the examples in FIGS. 4-7. For example, UE 702 may measure an inter-cell interference associated with the one or more time and frequency resources of the at least one neighboring base station, as described in connection with 740 in FIG. 7. Further, 906 may be performed by determination component 1240 in FIG. 12.

At 908, the UE may transmit, to the first base station, a report of the inter-cell interference measurement of the at least one neighboring base station, as described in connection with the examples in FIGS. 4-7. For example, UE 702 may transmit, to the first base station, a report of the inter-cell interference measurement of the at least one neighboring base station, as described in connection with 750 in FIG. 7. Further, 908 may be performed by determination component 1240 in FIG. 12. The report of the inter-cell interference measurement may include at least one of: the at least one scrambling ID or the one or more time and frequency resources. The report of the inter-cell interference measurement may be included in a channel state information (CSI) report.

At 910, the UE may receive, from the first base station, downlink data associated with the inter-cell interference, as described in connection with the examples in FIGS. 4-7. For example, UE 702 may receive, from the first base station, downlink data associated with the inter-cell interference, as described in connection with 762 in FIG. 7. Further, 910 may be performed by determination component 1240 in FIG. 12. The downlink data may be received via a physical downlink shared channel (PDSCH).

At 912, the UE may transmit, to the first base station, an acknowledgement (ACK) or a negative ACK (NACK) based on the downlink data associated with the inter-cell interference, as described in connection with the examples in FIGS. 4-7. For example, UE 702 may transmit, to the first base station, an acknowledgement (ACK) or a negative ACK (NACK) based on the downlink data associated with the inter-cell interference, as described in connection with 770 in FIG. 7. Further, 912 may be performed by determination component 1240 in FIG. 12. The ACK or the NACK may be associated with the inter-cell interference measurement of the at least one neighboring base station. The ACK may indicate the UE decoded the PDSCH based on the inter-cell interference measurement of the at least one neighboring base station. The NACK may indicate the UE did not decode the PDSCH based on the inter-cell interference measurement of the at least one neighboring base station. Also, the ACK or the NACK may be transmitted via a physical uplink control channel (PUCCH).

Figure 10:
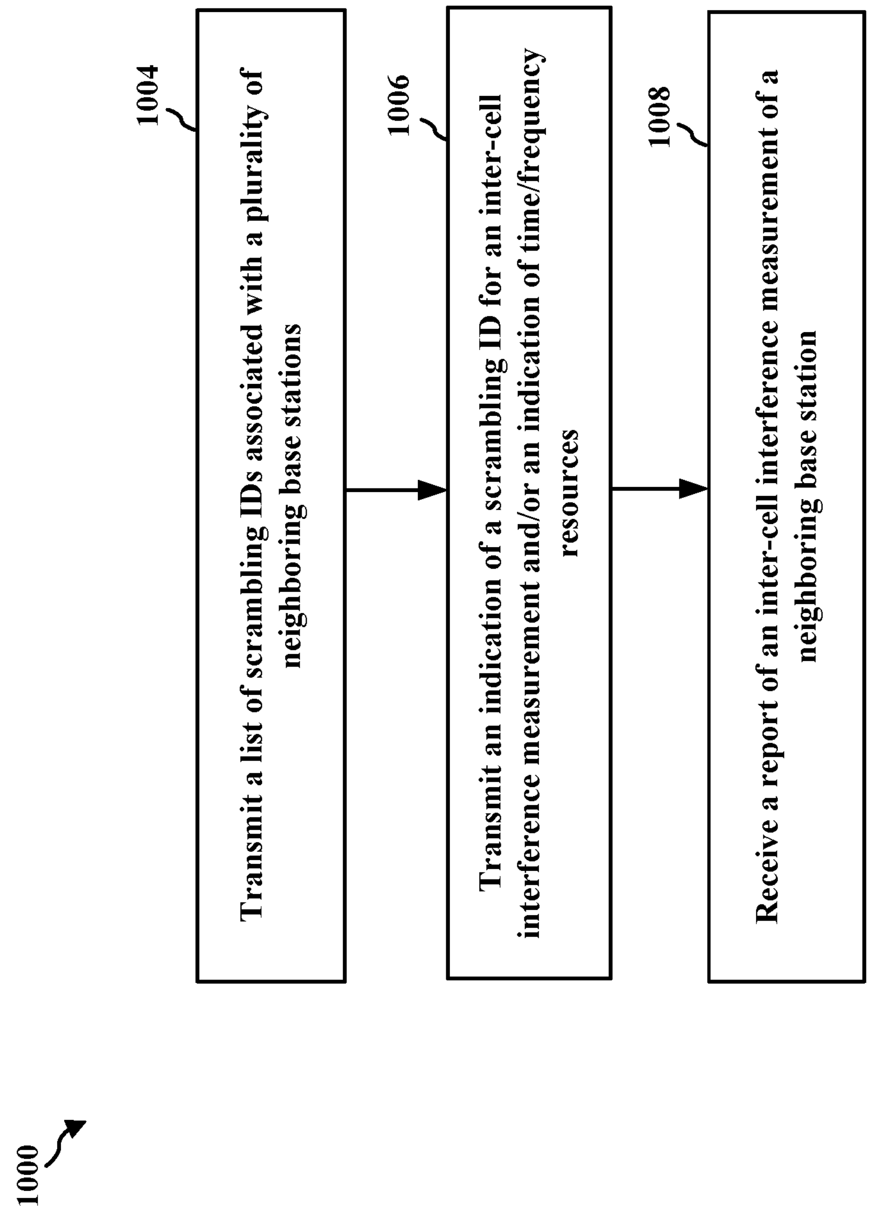
FIG. 10 is a flowchart of a method of wireless communication.

FIG. 10 is a flowchart 1000 of a method of wireless communication. The method may be performed by a base station or a component of a base station (e.g., the base station 102, 180, 310, 410, 502, 552, 610, 704; the apparatus 1302). The methods described herein may provide a number of benefits, such as improving communication signaling, resource utilization, and/or power savings.

At 1004, the base station may transmit, to at least one UE, a list of scrambling identifiers (IDs) associated with a plurality of neighboring base stations, as described in connection with the examples in FIGS. 4-7. For example, base station 704 may transmit, to at least one UE, a list of scrambling identifiers (IDs) associated with a plurality of neighboring base stations, as described in connection with 720 in FIG. 7. Further, 1004 may be performed by determination component 1340 in FIG. 13. The list of scrambling IDs may include one or more scrambling IDs associated with scrambling a demodulation reference signal (DMRS) of a physical downlink shared channel (PDSCH) transmission. The base station may be a serving base station of the at least one UE.

At 1006, the base station may transmit, to the at least one UE, at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement, as described in connection with the examples in FIGS. 4-7. For example, base station 704 may transmit, to the at least one UE, at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement, as described in connection with 730 in FIG. 7. Further, 1006 may be performed by determination component 1340 in FIG. 13.

In some aspects, the indication of the one or more time and frequency resources may be transmitted via downlink control information (DCI). The indication of the at least one scrambling ID may be transmitted via at least one of: downlink control information (DCI), a medium access control (MAC) control element (MAC-CE), or a radio resource control (RRC) message. The list of scrambling IDs may be transmitted via a medium access control (MAC) control element (MAC-CE) or a radio resource control (RRC) message. The indication of the one or more time and frequency resources may indicate a receive (Rx) beam or a transmission configuration indication (TCI) state for the inter-cell interference measurement. Also, the indication of the one or more time and frequency resources may indicate a time or a frequency in which to transmit the report of the inter-cell interference measurement.

Additionally, the one or more time and frequency resources may be associated with at least one of the inter-cell interference measurement or scheduling an uplink transmission of the report of the inter-cell interference measurement. At least one of the at least one scrambling ID or the one or more time and frequency resources may be associated with one or more pseudo-random sequences for the inter-cell interference measurement. The one or more time and frequency resources may include a first set of time and frequency resources for the inter-cell interference measurement and a second set of time and frequency resources for the report of the inter-cell interference measurement.

At 1008, the base station may receive, from the at least one UE, a report of the inter-cell interference measurement of the at least one neighboring base station, as described in connection with the examples in FIGS. 4-7. For example, base station 704 may receive, from the at least one UE, a report of the inter-cell interference measurement of the at least one neighboring base station, as described in connection with 752 in FIG. 7. Further, 1008 may be performed by determination component 1340 in FIG. 13. The report of the inter-cell interference measurement may include at least one of: the at least one scrambling ID or the one or more time and frequency resources. The report of the inter-cell interference measurement may be included in a channel state information (CSI) report.

Figure 11:
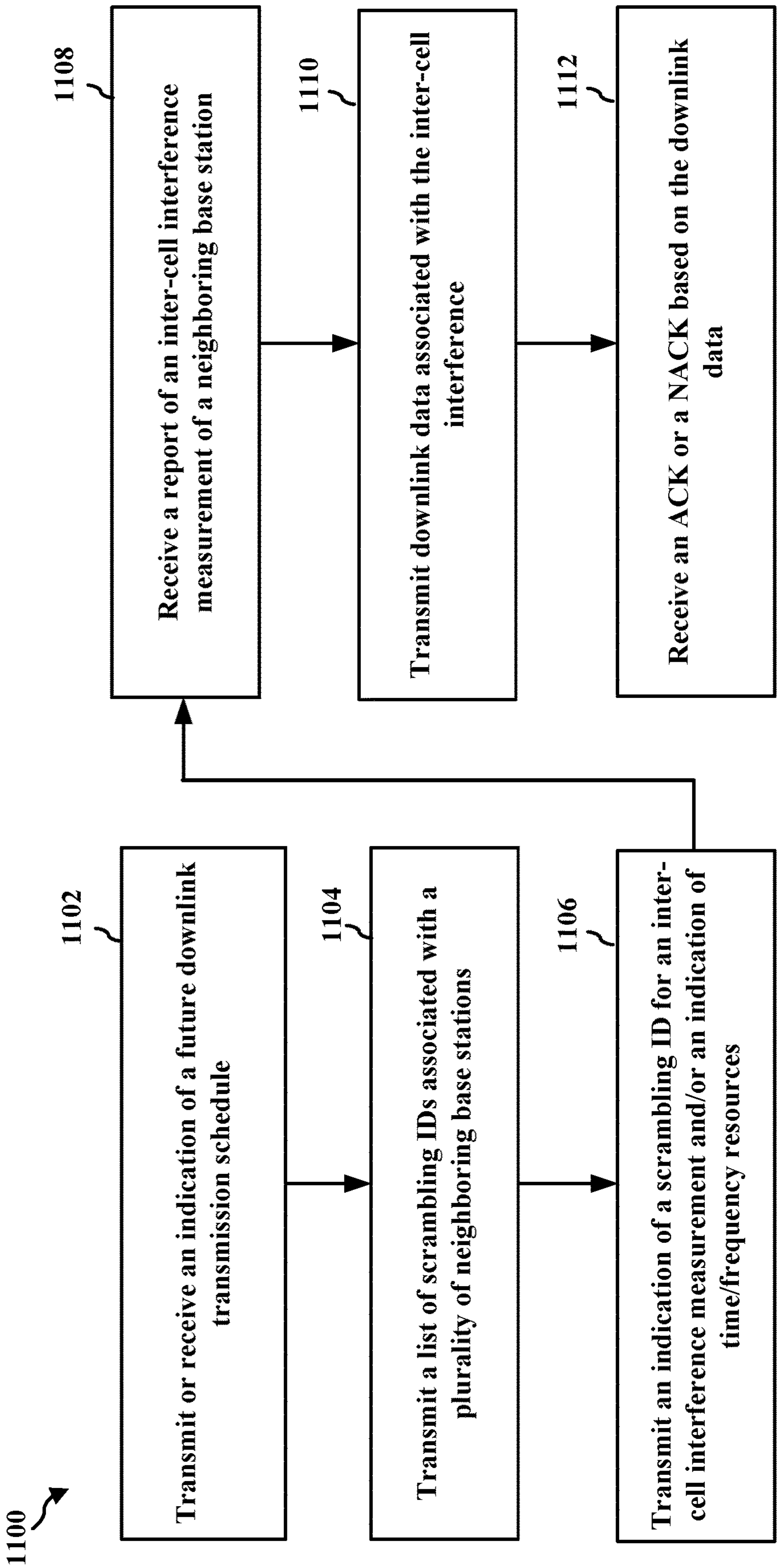
FIG. 11 is a flowchart of a method of wireless communication.

FIG. 11 is a flowchart 1100 of a method of wireless communication. The method may be performed by a base station or a component of a base station (e.g., the base station 102, 180, 310, 410, 502, 552, 610, 704; the apparatus 1302). The methods described herein may provide a number of benefits, such as improving communication signaling, resource utilization, and/or power savings.

At 1102, the base station may transmit, to at least one of the plurality of neighboring base stations, a first indication of a future downlink transmission schedule; or receive, from one or more of the plurality of neighboring base stations, a second indication of the future downlink transmission schedule, as described in connection with the examples in FIGS. 4-7. For example, base station 704 may transmit, to at least one of the plurality of neighboring base stations, a first indication of a future downlink transmission schedule; or receive, from one or more of the plurality of neighboring base stations, a second indication of the future downlink transmission schedule, as described in connection with 710 in FIG. 7. Further, 1102 may be performed by determination component 1340 in FIG. 13.

At 1104, the base station may transmit, to at least one UE, a list of scrambling identifiers (IDs) associated with a plurality of neighboring base stations, as described in connection with the examples in FIGS. 4-7. For example, base station 704 may transmit, to at least one UE, a list of scrambling identifiers (IDs) associated with a plurality of neighboring base stations, as described in connection with 720 in FIG. 7. Further, 1104 may be performed by determination component 1340 in FIG. 13. The list of scrambling IDs may include one or more scrambling IDs associated with scrambling a demodulation reference signal (DMRS) of a physical downlink shared channel (PDSCH) transmission. The base station may be a serving base station of the at least one UE.

At 1106, the base station may transmit, to the at least one UE, at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement, as described in connection with the examples in FIGS. 4-7. For example, base station 704 may transmit, to the at least one UE, at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement, as described in connection with 730 in FIG. 7. Further, 1106 may be performed by determination component 1340 in FIG. 13.

In some aspects, the indication of the one or more time and frequency resources may be transmitted via downlink control information (DCI). The indication of the at least one scrambling ID may be transmitted via at least one of: downlink control information (DCI), a medium access control (MAC) control element (MAC-CE), or a radio resource control (RRC) message. The list of scrambling IDs may be transmitted via a medium access control (MAC) control element (MAC-CE) or a radio resource control (RRC) message. The indication of the one or more time and frequency resources may indicate a receive (Rx) beam or a transmission configuration indication (TCI) state for the inter-cell interference measurement. Also, the indication of the one or more time and frequency resources may indicate a time or a frequency in which to transmit the report of the inter-cell interference measurement.

Additionally, the one or more time and frequency resources may be associated with at least one of the inter-cell interference measurement or scheduling an uplink transmission of the report of the inter-cell interference measurement. At least one of the at least one scrambling ID or the one or more time and frequency resources may be associated with one or more pseudo-random sequences for the inter-cell interference measurement. The one or more time and frequency resources may include a first set of time and frequency resources for the inter-cell interference measurement and a second set of time and frequency resources for the report of the inter-cell interference measurement.

At 1108, the base station may receive, from the at least one UE, a report of the inter-cell interference measurement of the at least one neighboring base station, as described in connection with the examples in FIGS. 4-7. For example, base station 704 may receive, from the at least one UE, a report of the inter-cell interference measurement of the at least one neighboring base station, as described in connection with 752 in FIG. 7. Further, 1108 may be performed by determination component 1340 in FIG. 13. The report of the inter-cell interference measurement may include at least one of: the at least one scrambling ID or the one or more time and frequency resources. The report of the inter-cell interference measurement may be included in a channel state information (CSI) report.

At 1110, the base station may transmit, to the at least one UE, downlink data associated with the inter-cell interference measurement, as described in connection with the examples in FIGS. 4-7. For example, base station 704 may transmit, to the at least one UE, downlink data associated with the inter-cell interference measurement, as described in connection with 760 in FIG. 7. Further, 1110 may be performed by determination component 1340 in FIG. 13. The downlink data may be transmitted via a physical downlink shared channel (PDSCH).

At 1112, the base station may receive, from the at least one UE, an acknowledgement (ACK) or a negative ACK (NACK) based on the downlink data associated with the inter-cell interference measurement, as described in connection with the examples in FIGS. 4-7. For example, base station 704 may receive, from the at least one UE, an acknowledgement (ACK) or a negative ACK (NACK) based on the downlink data associated with the inter-cell interference measurement, as described in connection with 772 in FIG. 7. Further, 1112 may be performed by determination component 1340 in FIG. 13. The ACK or the NACK may be associated with the inter-cell interference measurement of the at least one neighboring base station. The ACK may indicate the at least one UE decoded the PDSCH based on the inter-cell interference measurement of the at least one neighboring base station. The NACK may indicate the at least one UE did not decode the PDSCH based on the inter-cell interference measurement of the at least one neighboring base station. Also, the ACK or the NACK may be received via a physical uplink control channel (PUCCH).

Figure 12:
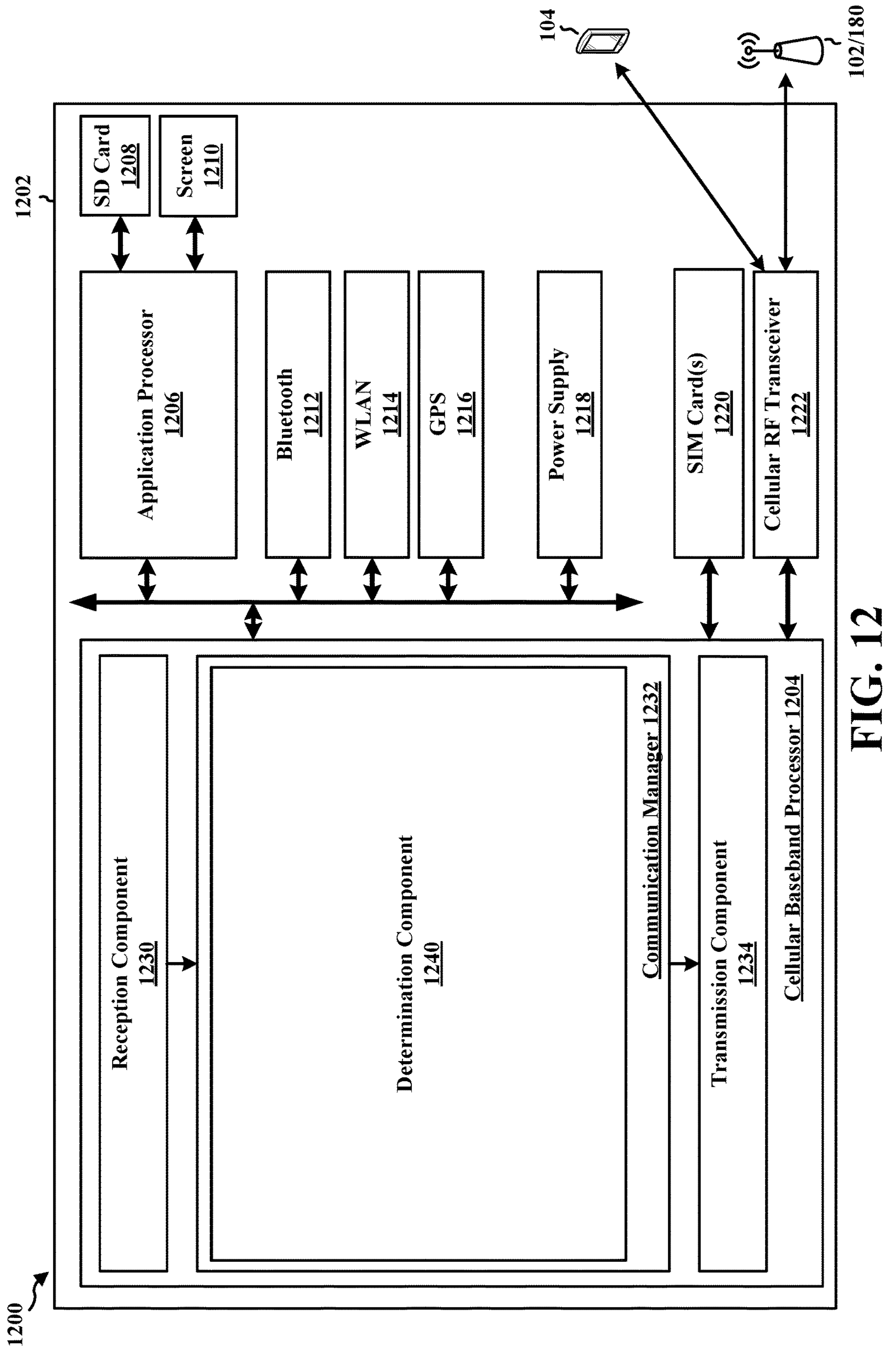
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a determination component 1240 that is configured to receive, from a first base station, a list of scrambling identifiers (ID s) associated with a plurality of neighboring base stations, e.g., as described in connection with step 902 above. Determination component 1240 may also be configured to receive, from the first base station, at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement, e.g., as described in connection with step 904 above. Determination component 1240 may also be configured to measure an inter-cell interference associated with the one or more time and frequency resources of the at least one neighboring base station, e.g., as described in connection with step 906 above. Determination component 1240 may also be configured to transmit, to the first base station, a report of the inter-cell interference measurement of the at least one neighboring base station, e.g., as described in connection with step 908 above. Determination component 1240 may also be configured to receive, from the first base station, downlink data associated with the inter-cell interference, e.g., as described in connection with step 910 above. Determination component 1240 may also be configured to transmit, to the first base station, an acknowledgement (ACK) or a negative ACK (NACK) based on the downlink data associated with the inter-cell interference, e.g., as described in connection with step 912 above.

The apparatus may include additional components that perform each of the blocks of the algorithm in the flowcharts of FIGS. 7-9. As such, each block in the flowcharts of FIGS. 7-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for receiving, from a first base station, a list of scrambling identifiers (IDs) associated with a plurality of neighboring base stations; means for receiving, from the first base station, at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement; means for measuring an inter-cell interference associated with the one or more time and frequency resources of the at least one neighboring base station; means for transmitting, to the first base station, a report of the inter-cell interference measurement of the at least one neighboring base station; means for receiving, from the first base station, downlink data associated with the inter-cell interference; and means for transmitting, to the first base station, an acknowledgement (ACK) or a negative ACK (NACK) based on the downlink data associated with the inter-cell interference. The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 13:
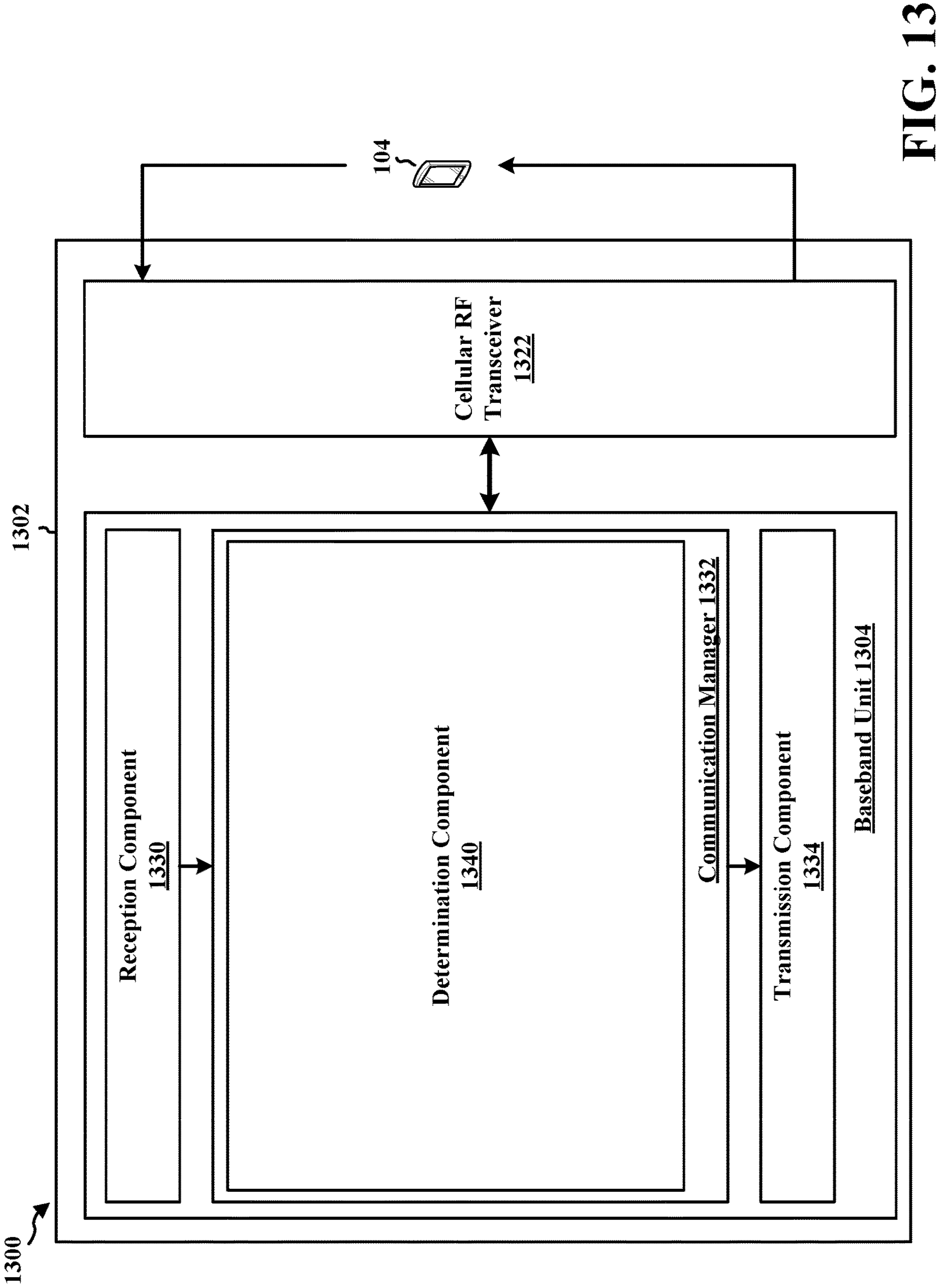
FIG. 13 is a diagram illustrating an example of a hardware implementation for an example apparatus.

FIG. 13 is a diagram 1300 illustrating an example of a hardware implementation for an apparatus 1302. The apparatus 1302 may be a base station, a component of a base station, or may implement base station functionality. In some aspects, the apparatus 1302 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes a determination component 1340 that is configured to transmit, to at least one of the plurality of neighboring base stations, a first indication of a future downlink transmission schedule; or receive, from one or more of the plurality of neighboring base stations, a second indication of the future downlink transmission schedule, e.g., as described in connection with step 1102 above. Determination component 1340 may also be configured to transmit, to at least one UE, a list of scrambling identifiers (IDs) associated with a plurality of neighboring base stations, e.g., as described in connection with step 1104 above. Determination component 1340 may also be configured to transmit, to the at least one UE, at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement, e.g., as described in connection with step 1106 above. Determination component 1340 may also be configured to receive, from the at least one UE, a report of the inter-cell interference measurement of the at least one neighboring base station, e.g., as described in connection with step 1108 above. Determination component 1340 may also be configured to transmit, to the at least one UE, downlink data associated with the inter-cell interference measurement, e.g., as described in connection with step 1110 above. Determination component 1340 may also be configured to receive, from the at least one UE, an acknowledgement (ACK) or a negative ACK (NACK) based on the downlink data associated with the inter-cell interference measurement, e.g., as described in connection with step 1112 above.

The apparatus may include additional components that perform each of the blocks of the algorithm in the flowcharts of FIGS. 7, 10, and 11. As such, each block in the flowcharts of FIGS. 7, 10, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for transmitting, to at least one of the plurality of neighboring base stations, a first indication of a future downlink transmission schedule; means for receiving, from one or more of the plurality of neighboring base stations, a second indication of the future downlink transmission schedule; means for transmitting, to at least one UE, a list of scrambling identifiers (IDs) associated with a plurality of neighboring base stations; means for transmitting, to the at least one UE, at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement; means for receiving, from the at least one UE, a report of the inter-cell interference measurement of the at least one neighboring base station; means for transmitting, to the at least one UE, downlink data associated with the inter-cell interference measurement; and means for receiving, from the at least one UE, an acknowledgement (ACK) or a negative ACK (NACK) based on the downlink data associated with the inter-cell interference measurement. The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to: receive, from a first base station, a list of scrambling identifiers (IDs) associated with a plurality of neighboring base stations; receive, from the first base station, at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement; measure an inter-cell interference associated with the one or more time and frequency resources of the at least one neighboring base station; and transmitting, to the first base station, a report of the inter-cell interference measurement of the at least one neighboring base station.

Aspect 2 is the apparatus of aspect 1, where the indication of the one or more time and frequency resources is received via downlink control information (DCI).

Aspect 3 is the apparatus of any of aspects 1 and 2, where the indication of the at least one scrambling ID is received via at least one of: downlink control information (DCI), a medium access control (MAC) control element (MAC-CE), or a radio resource control (RRC) message.

Aspect 4 is the apparatus of any of aspects 1 to 3, where the list of scrambling IDs is received via a medium access control (MAC) control element (MAC-CE) or a radio resource control (RRC) message.

Aspect 5 is the apparatus of any of aspects 1 to 4, where the indication of the one or more time and frequency resources indicates a receive (Rx) beam or a transmission configuration indication (TCI) state for the inter-cell interference measurement.

Aspect 6 is the apparatus of any of aspects 1 to 5, where the one or more time and frequency resources are associated with at least one of the inter-cell interference measurement or scheduling an uplink transmission of the report of the inter-cell interference measurement.

Aspect 7 is the apparatus of any of aspects 1 to 6, where at least one of the at least one scrambling ID or the one or more time and frequency resources are associated with one or more pseudo-random sequences for the inter-cell interference measurement.

Aspect 8 is the apparatus of any of aspects 1 to 7, where the one or more time and frequency resources include a first set of time and frequency resources for the inter-cell interference measurement and a second set of time and frequency resources for the report of the inter-cell interference measurement.

Aspect 9 is the apparatus of any of aspects 1 to 8, where the first base station is a serving base station of the UE.

Aspect 10 is the apparatus of any of aspects 1 to 9, where the at least one processor is further configured to: receive, from the first base station, downlink data associated with the inter-cell interference; and transmit, to the first base station, an acknowledgement (ACK) or a negative ACK (NACK) based on the downlink data associated with the inter-cell interference.

Aspect 11 is the apparatus of any of aspects 1 to 10, where the ACK or the NACK is associated with the inter-cell interference measurement of the at least one neighboring base station.

Aspect 12 is the apparatus of any of aspects 1 to 11, where the downlink data is received via a physical downlink shared channel (PDSCH).

Aspect 13 is the apparatus of any of aspects 1 to 12, where the ACK indicates the UE decoded the PDSCH based on the inter-cell interference measurement of the at least one neighboring base station.

Aspect 14 is the apparatus of any of aspects 1 to 13, where the NACK indicates the UE did not decode the PDSCH based on the inter-cell interference measurement of the at least one neighboring base station.

Aspect 15 is the apparatus of any of aspects 1 to 14, where the ACK or the NACK is transmitted via a physical uplink control channel (PUCCH).

Aspect 16 is the apparatus of any of aspects 1 to 15, where the report of the inter-cell interference measurement includes at least one of: the at least one scrambling ID or the one or more time and frequency resources.

Aspect 17 is the apparatus of any of aspects 1 to 16, where the report of the inter-cell interference measurement is included in a channel state information (CSI) report.

Aspect 18 is the apparatus of any of aspects 1 to 17, where the indication of the one or more time and frequency resources indicates a time or a frequency in which to transmit the report of the inter-cell interference measurement.

Aspect 19 is the apparatus of any of aspects 1 to 18, where the list of scrambling IDs includes one or more scrambling IDs associated with scrambling a demodulation reference signal (DMRS) of a physical downlink shared channel (PDSCH) transmission.

Aspect 20 is the apparatus of any of aspects 1 to 19, further including a transceiver or an antenna coupled to the at least one processor.

Aspect 21 is a method of wireless communication for implementing any of aspects 1 to 20.

Aspect 22 is an apparatus for wireless communication including means for implementing any of aspects 1 to 20.

Aspect 23 is a computer-readable medium storing computer executable code, where the code when executed by a processor causes the processor to implement any of aspects 1 to 20.

Aspect 24 is an apparatus for wireless communication at a base station including at least one processor coupled to a memory and configured to: transmit, to at least one UE, a list of scrambling identifiers (IDs) associated with a plurality of neighboring base stations; transmit, to the at least one UE, at least one of: an indication of at least one scrambling ID of the list of scrambling IDs for an inter-cell interference measurement of at least one neighboring base station of the plurality of neighboring base stations or an indication of one or more time and frequency resources of the at least one neighboring base station for the inter-cell interference measurement; and receive, from the at least one UE, a report of the inter-cell interference measurement of the at least one neighboring base station.

Aspect 25 is the apparatus of aspect 24, where the indication of the one or more time and frequency resources is transmitted via downlink control information (DCI).

Aspect 26 is the apparatus of any of aspects 24 and 25, where the indication of the at least one scrambling ID is transmitted via at least one of: downlink control information (DCI), a medium access control (MAC) control element (MAC-CE), or a radio resource control (RRC) message.

Aspect 27 is the apparatus of any of aspects 24 to 26, where the list of scrambling IDs is transmitted via a medium access control (MAC) control element (MAC-CE) or a radio resource control (RRC) message.

Aspect 28 is the apparatus of any of aspects 24 to 27, where the indication of the one or more time and frequency resources indicates a receive (Rx) beam or a transmission configuration indication (TCI) state for the inter-cell interference measurement.

Aspect 29 is the apparatus of any of aspects 24 to 28, where the one or more time and frequency resources are associated with at least one of the inter-cell interference measurement or scheduling an uplink transmission of the report of the inter-cell interference measurement.

Aspect 30 is the apparatus of any of aspects 24 to 29, where at least one of the at least one scrambling ID or the one or more time and frequency resources are associated with one or more pseudo-random sequences for the inter-cell interference measurement.

Aspect 31 is the apparatus of any of aspects 24 to 30, where the one or more time and frequency resources include a first set of time and frequency resources for the inter-cell interference measurement and a second set of time and frequency resources for the report of the inter-cell interference measurement.

Aspect 32 is the apparatus of any of aspects 24 to 31, where the base station is a serving base station of the at least one UE.

Aspect 33 is the apparatus of any of aspects 24 to 32, where the at least one processor is further configured to: transmit, to the at least one UE, downlink data associated with the inter-cell interference measurement; and receive, from the at least one UE, an acknowledgement (ACK) or a negative ACK (NACK) based on the downlink data associated with the inter-cell interference measurement.

Aspect 34 is the apparatus of any of aspects 24 to 33, where the ACK or the NACK is associated with the inter-cell interference measurement of the at least one neighboring base station.

Aspect 35 is the apparatus of any of aspects 24 to 34, where the downlink data is transmitted via a physical downlink shared channel (PDSCH).

Aspect 36 is the apparatus of any of aspects 24 to 35, where the ACK indicates the at least one UE decoded the PDSCH based on the inter-cell interference measurement of the at least one neighboring base station.

Aspect 37 is the apparatus of any of aspects 24 to 36, where the NACK indicates the at least one UE did not decode the PDSCH based on the inter-cell interference measurement of the at least one neighboring base station.

Aspect 38 is the apparatus of any of aspects 24 to 37, where the ACK or the NACK is received via a physical uplink control channel (PUCCH).

Aspect 39 is the apparatus of any of aspects 24 to 38, where the at least one processor is further configured to: transmit, to at least one of the plurality of neighboring base stations, a first indication of a future downlink transmission schedule; or receive, from one or more of the plurality of neighboring base stations, a second indication of the future downlink transmission schedule.

Aspect 40 is the apparatus of any of aspects 24 to 39, where the list of scrambling IDs includes one or more scrambling IDs associated with scrambling a demodulation reference signal (DMRS) of a physical downlink shared channel (PDSCH) transmission.

Aspect 41 is the apparatus of any of aspects 24 to 40, where the report of the inter-cell interference measurement includes at least one of: the at least one scrambling ID or the one or more time and frequency resources.

Aspect 42 is the apparatus of any of aspects 24 to 41, where the report of the inter-cell interference measurement is included in a channel state information (CSI) report.

Aspect 43 is the apparatus of any of aspects 24 to 42, where the indication of the one or more time and frequency resources indicates a time or a frequency in which to transmit the report of the inter-cell interference measurement.

Aspect 44 is the apparatus of any of aspects 24 to 43, further including a transceiver or an antenna coupled to the at least one processor.

Aspect 45 is a method of wireless communication for implementing any of aspects 24 to 44.

Aspect 46 is an apparatus for wireless communication including means for implementing any of aspects 24 to 44.

Aspect 47 is a computer-readable medium storing computer executable code, where the code when executed by a processor causes the processor to implement any of aspects 24 to 44.

What is claimed is:

1. An apparatus for wireless s communication at a user equipment (UE), comprising:
- memory; and
- at least one processor coupled to the memory and configured to:
  - receive, from a first base station, a radio resource control (RRC) configuration message that comprises a list of scrambling identifiers (IDs) associated with a plurality of neighboring base stations, wherein each scrambling ID of the list of scrambling IDs corresponds to a respective physical downlink shared channel (PDSCH) transmission of a respective neighboring base station of the plurality of neighboring base stations;
  - receive, from the first base station via an RRC message, an indication of one scrambling ID of the list of scrambling IDs for an inter-cell signal measurement of at least one neighboring base station of the plurality of neighboring base stations and an indication of one or more time and frequency resources of the at least one neighboring base station for the inter-cell signal measurement;
  - measure an inter-cell signal associated with the one or more time and frequency resources of the at least one neighboring base station; and
  - transmit, to the first base station, a report of the inter-cell signal measurement of the at least one neighboring base station, wherein the report comprises physical location information associated with the UE.

2. The apparatus of claim 1, wherein to receive the indication of the one or more time and frequency resources, the at least one processor is configured to receive the indication of the one or more time and frequency resources via downlink control information (DCI).

3. The apparatus of claim 1, wherein the indication of the one or more time and frequency resources indicates a receive (Rx) beam or a transmission configuration indication (TCI) state for the inter-cell signal measurement.

4. The apparatus of claim 1, wherein the one or more time and frequency resources are associated with at least one of the inter-cell signal measurement or scheduling an uplink transmission of the report of the inter-cell signal measurement.

5. The apparatus of claim 1, wherein at least one of the one scrambling ID or the one or more time and frequency resources are associated with one or more pseudo-random sequences for the inter-cell signal measurement.

6. The apparatus of claim 1, wherein the one or more time and frequency resources include a first set of time and frequency resources for the inter-cell signal measurement and a second set of time and frequency resources for the report of the inter-cell signal measurement.

7. The apparatus of claim 1, wherein the first base station is a serving base station of the UE.

8. The apparatus of claim 1, wherein the at least one processor is further configured to:
- receive, from the first base station, downlink data associated with the inter-cell signal; and
- transmit, to the first base station, an acknowledgement (ACK) or a negative ACK (NACK) based on the downlink data associated with the inter-cell signal.

9. The apparatus of claim 8, wherein the ACK or the NACK is associated with the inter-cell signal measurement of the at least one neighboring base station.

10. The apparatus of claim 8, wherein to receive the downlink data, the at least one processor is configured to receive the downlink data via a PDSCH.

11. The apparatus of claim 10, wherein the ACK indicates the UE decoded the PDSCH based on the inter-cell signal measurement of the at least one neighboring base station.

12. The apparatus of claim 10, wherein the NACK indicates the UE did not decode the PDSCH based on the inter-cell signal measurement of the at least one neighboring base station.

13. The apparatus of claim 8, wherein to transmit the ACK or the NACK, the at least one processor is configured to transmit the ACK or the NACK via a physical uplink control channel (PUCCH).

14. The apparatus of claim 1, wherein the report of the inter-cell signal measurement includes at least one of: the one scrambling ID or the one or more time and frequency resources.

15. The apparatus of claim 1, wherein the report of the inter-cell signal measurement is included in a channel state information (CSI) report.

16. The apparatus of claim 1, wherein the indication of the one or more time and frequency resources indicates a time or a frequency in which to transmit the report of the inter-cell signal measurement.

17. The apparatus of claim 1, further comprising a transceiver or an antenna coupled to the at least one processor, wherein the list of scrambling IDs includes one or more scrambling IDs associated with scrambling a demodulation reference signal (DMRS) of a physical downlink shared channel (PDSCH) transmission.

18. A method of wireless communication at a user equipment (UE), comprising:

receiving, from a first base station, a radio resource control (RRC) configuration message that comprises a list of scrambling identifiers (IDs) associated with a plurality of neighboring base stations, wherein each scrambling ID of the list of scrambling IDs corresponds to a respective physical downlink shared channel (PDSCH) transmission of a respective neighboring base station of the plurality of neighboring base stations;

receiving, from the first base station via an RRC message, an indication of one scrambling ID of the list of scrambling IDs for an inter-cell signal measurement of at least one neighboring base station of the plurality of neighboring base stations and an indication of one or more time and frequency resources of the at least one neighboring base station for the inter-cell signal measurement;

measuring an inter-cell signal associated with the one or more time and frequency resources of the at least one neighboring base station; and transmitting, to the first base station, a report of the inter-cell signal measurement of the at least one neighboring base station, wherein the report comprises physical location information associated with the UE.

19. An apparatus for wireless communication at a base station, comprising:

memory; and at least one processor coupled to the memory and configured to:

transmit, to at least one UE, a radio resource control (RRC) configuration message that comprises a list of scrambling identifiers (IDs) associated with a plurality of neighboring base stations, wherein each scrambling ID of the list of scrambling IDs corresponds to a respective physical downlink shared channel (PDSCH) transmission of a respective neighboring base station of the plurality of neighboring base stations;

transmit, to the at least one UE via an RRC message, an indication of one scrambling ID of the list of scrambling IDs for an inter-cell signal measurement of at least one neighboring base station of the plurality of neighboring base stations and an indication of one or more time and frequency resources of the at least one neighboring base station for the inter-cell signal measurement; and receive, from the at least one UE, a report of the inter-cell signal measurement of the at least one neighboring base station, wherein the report comprises physical location information associated with the at least one UE.

20. The apparatus of claim 19, wherein the indication of the one or more time and frequency resources indicates a receive (Rx) beam or a transmission configuration indication (TCI) state for the inter-cell signal measurement, wherein the one or more time and frequency resources are associated with at least one of the inter-cell signal measurement or scheduling an uplink transmission of the report of the inter-cell signal measurement.

21. The apparatus of claim 19, wherein at least one of the at least one scrambling ID or the one or more time and frequency resources are associated with one or more pseudo-random sequences for the inter-cell signal measurement.

22. The apparatus of claim 19, wherein the one or more time and frequency resources include a first set of time and frequency resources for the inter-cell signal measurement and a second set of time and frequency resources for the report of the inter-cell signal measurement, wherein the base station is a serving base station of the at least one UE.

23. The apparatus of claim 19, wherein the at least one processor is further configured to:

transmit, to the at least one UE, downlink data associated with the inter-cell signal measurement; and receive, from the at least one UE, an acknowledgement (ACK) or a negative ACK (NACK) based on the downlink data associated with the inter-cell signal measurement.

24. The apparatus of claim 23, wherein the ACK or the NACK is associated with the inter-cell signal measurement of the at least one neighboring base station, wherein to receive the ACK or the NACK, the at least one processor is configured to receive the ACK or the NACK via a physical uplink control channel (PUCCH).

25. The apparatus of claim 23, wherein to transmit the downlink data, the at least one processor is configured to transmit the downlink data via a physical downlink shared channel (PDSCH), wherein the ACK indicates the at least one UE decoded the PDSCH based on the inter-cell signal measurement of the at least one neighboring base station, wherein the NACK indicates the at least one UE did not decode the PDSCH based on the inter-cell signal measurement of the at least one neighboring base station.

26. The apparatus of claim 19, further comprising a transceiver or an antenna coupled to the at least one processor, wherein the at least one processor is further configured to:

transmit, to at least one of the plurality of neighboring base stations, a first indication of a future downlink transmission schedule; or receive, from one or more of the plurality of neighboring base stations, a second indication of the future downlink transmission schedule.

27. A method of wireless communication at a base station, comprising:

transmitting, to at least one UE, a radio resource control (RRC) configuration message that comprises a list of scrambling identifiers (IDs) associated with a plurality of neighboring base stations, wherein each scrambling ID of the list of scrambling IDs corresponds to a respective physical downlink shared channel (PDSCH) transmission of a respective neighboring base station of the plurality of neighboring base stations;

transmitting, to the at least one UE via an RRC message, an indication of one scrambling ID of the list of scrambling IDs for an inter-cell signal measurement of at least one neighboring base station of the plurality of neighboring base stations and an indication of one or more time and frequency resources of the at least one neighboring base station for the inter-cell signal measurement; and receiving, from the at least one UE, a report of the inter-cell signal measurement of the at least one neighboring base station, wherein the report comprises physical location information associated with the at least one UE.

* * * * *